US012636676B2

(12) United States Patent　　　(10) Patent No.:　US 12,636,676 B2
Glasson et al.　　　　　　　　　　(45) Date of Patent:　　May 26, 2026

(54) AEROSOL DEPOSITION APPARATUS, METHOD, AND FILTER BODY WITH DEPOSITS

(71) Applicant: CORNING INCORPORATED, Corning, NY (US)

(72) Inventors: Thomas Jean Glasson, Avon (FR); Huiqing Wu, Shanghai (CN); Xinfeng Xing, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 757 days.

(21) Appl. No.: 17/921,507

(22) PCT Filed: Apr. 28, 2020

(86) PCT No.: PCT/CN2020/087375
§ 371 (c)(1),
(2) Date: Oct. 26, 2022

(87) PCT Pub. No.: WO2021/217389
PCT Pub. Date: Nov. 4, 2021

(65) Prior Publication Data
US 2023/0173535 A1　　Jun. 8, 2023

(51) Int. Cl.
*B05C 19/00*　　　(2006.01)
*B01D 46/00*　　　(2022.01)
(Continued)

(52) U.S. Cl.
CPC ........ *B05C 19/007* (2013.01); *B01D 46/0001* (2013.01); *B01D 46/2474* (2013.01); *C04B 38/0012* (2013.01); *C04B 38/0096* (2013.01)

(58) Field of Classification Search
None
See application file for complete search history.

(56) References Cited

U.S. PATENT DOCUMENTS 5,953,832 A　*　9/1999　Rosynsky ............ B01J 37/0215
　　　　　　　　　　　　　　　　　34/92
8,006,637 B2　*　8/2011　Liu ..................... C23C 18/1628
　　　　　　　　　　　　　　　　　118/428
(Continued)

FOREIGN PATENT DOCUMENTS

CN　　　107670518 A　　2/2018
CN　　　109647088 A　　4/2019
(Continued)

OTHER PUBLICATIONS

Hanft et al., An Overview of Aerosol Deposition Method: Process Fundamentals and New Trends in Material Applications, J. Ceram. Sci. Tech., 06 [03], 2015, pp. 147-182.
(Continued)

*Primary Examiner* — Jethro M. Pence
(74) *Attorney, Agent, or Firm* — Kevin M. Able

(57)　　　　　ABSTRACT
Apparatus and methods are disclosed which apply inorganic particles to a plugged honeycomb body comprising porous walls, an inlet end and an outlet end. The apparatus comprises a Venturi tube through which the particles flow into a duct system. Filtration articles comprise: a plugged honeycomb body; inorganic deposits disposed within the plugged honeycomb filter body having a porosity in a range of greater than 95% to less than or equal to 99.9% and an average thickness in a range of greater than or equal to 0.5 µm to less than or equal to 50 µm; and a clean filtration efficiency of greater than or equal to 85% as measured by a smoke filtration efficiency test.

12 Claims, 15 Drawing Sheets

(51) Int. Cl.
    *B01D 46/24*       (2006.01)
    *C04B 38/00*       (2006.01)

(56)            References Cited

U.S. PATENT DOCUMENTS

| | | | |
|---|---|---|---|
| 9,096,923 B2* | 8/2015 | Clinton | C23C 18/125 |
| 9,227,184 B2* | 1/2016 | Nakano | B01J 35/56 |
| 9,352,277 B2 | 5/2016 | Sutton et al. | |
| 9,636,693 B2* | 5/2017 | Nakano | B05C 5/0241 |
| 11,117,124 B2 | 9/2021 | Beall et al. | |
| 12,275,024 B2* | 4/2025 | Burgess | B05C 7/04 |
| 2011/0229634 A1 | 9/2011 | Tsuji et al. | |
| 2020/0171515 A1* | 6/2020 | Burgess | B05D 1/02 |
| 2021/0197105 A1* | 7/2021 | Gu | C04B 38/0019 |
| 2021/0205750 A1* | 7/2021 | Liu | C04B 35/111 |
| 2023/0160329 A1* | 5/2023 | Boyuk | F01N 11/00 |
| | | | 60/277 |
| 2023/0213433 A1* | 7/2023 | Citriniti | G01N 15/0826 |
| | | | 356/338 |
| 2024/0251862 A1* | 8/2024 | Batista | A24F 40/42 |

FOREIGN PATENT DOCUMENTS

| | | |
|---|---|---|
| WO | 2008/150419 A1 | 12/2008 |
| WO | 2011/151711 A1 | 12/2011 |
| WO | 2014/151457 A2 | 9/2014 |

OTHER PUBLICATIONS

International Search Report and Written Opinion of the International Searching Authority; PCT/CN2020/087375; dated Aug. 17, 2020; 8 pages; European Patent Office.

* cited by examiner

AEROSOL DEPOSITION APPARATUS, METHOD, AND FILTER BODY WITH DEPOSITS

This application claims the benefit of priority under 35 U.S.C. § 365 of International Patent Application Serial No. PCT/CN2020/087375 filed on Apr. 28, 2020, the content of which is relied upon and incorporated herein by reference in its entirety.

TECHNICAL FIELD

Embodiments of the present disclosure generally relate to methods and apparatus for aerosol deposition of inorganic material on honeycomb bodies, and the honeycomb bodies such as filter bodies having the deposits.

BACKGROUND

Particulate filters, for example, diesel particulate filters and gasoline particulate filters (GPFs), filter particulates from the exhaust stream from vehicle engines burning diesel or gasoline fuel, respectively.

There is a need for improved methods and apparatus to achieve filters with higher filtration efficiency.

SUMMARY

One or more aspects of the disclosure are directed to: an apparatus configured to apply inorganic particles to a plugged honeycomb body comprising porous walls, an inlet end and an outlet end, the apparatus comprising: a duct spanning from a first end to a second end; a deposition zone configured to house the plugged honeycomb body and in fluid communication with the second end of the duct; an inlet conduit in fluid communication with the duct, the inlet conduit upstream from the deposition zone; an inorganic particle source in fluid communication with the inlet conduit configured to supply inorganic particles to the inlet conduit; an aerosol generator comprising a Venturi tube comprising a first end and a second end in fluid communication with the inlet conduit, the aerosol generator configured to deliver an aerosol comprising the inorganic particles and air to the deposition zone; and a flow generator in fluid communication with the duct and the deposition zone, the flow generator configured to establish a flow of a gas and the inorganic particles introduced into the duct.

In some embodiments, the aerosol generator is configured to deliver a dry aerosol to the deposition zone. In some embodiments, the aerosol generator further comprises: a delivery conduit comprising a flared first end configured to receive the inorganic particles from the inorganic particle source. In some embodiments, the delivery conduit further comprises: a second end connected to the first end of the Venturi tube, the apparatus further comprising a pressurized gas source in communication with the inlet conduit. In some embodiments, the Venturi tube comprises: a reduced cross-sectional area portion between the first end and the second end of the Venturi tube.

In one or more embodiments, the apparatus further comprises: an inorganic particle feed system configured to deliver inorganic particles from the inorganic particle source to the inlet conduit. In an embodiment, the inorganic particle feed system comprises a conveyor.

In some embodiments, the apparatus further comprises: a drying apparatus configured to dry the inorganic particles, the drying apparatus positioned upstream from the delivery conduit. In an embodiment, the drying apparatus comprising a drying lamp.

In some embodiments, the apparatus further comprises: a roller positioned upstream from the delivery conduit, the roller configured to reduce agglomerates that enter the delivery conduit.

In some embodiments, the flow generator comprises a fan. In an embodiment, the fan is positioned at the inlet end of the duct and upstream from the inlet conduit.

In some embodiments, the apparatus further comprises: a homogenizer plate configured to homogenize flow through the duct.

In some embodiments, the apparatus further comprises: a first pressure sensor located upstream from the deposition zone and a second pressure sensor downstream from the deposition zone, the first pressure sensor and the second pressure sensor in communication with a processor which measures a differential pressure between the first pressure sensor and the second pressure sensor.

One or more aspects of the disclosure are directed to: an apparatus configured to apply inorganic particles to a plugged honeycomb body comprising porous walls, an inlet end and an outlet end, the apparatus comprising: a duct spanning from a first end to a second end; a deposition zone configured to house the plugged honeycomb body in fluid communication with the second end of the duct; an inlet conduit in fluid communication with the duct, the inlet conduit upstream from the deposition zone; an inorganic particle source in fluid communication with the inlet conduit configured to supply inorganic particles to the inlet conduit; an inorganic particle feed system configured to deliver inorganic particles from the inorganic particle source to the inlet conduit; a roller positioned upstream from the inlet conduit, the roller configured to reduce agglomerates that enter the delivery conduit; an aerosol generator comprising a Venturi tube comprising a first end and a second end in fluid communication with the inlet conduit, the aerosol generator configured to deliver a dry aerosol consisting essentially of the inorganic particles and air to the deposition zone; and a flow generator in fluid communication with the duct and the deposition zone, the flow generator positioned at the inlet end of the duct and upstream from the inlet conduit and configured to establish a flow of a gas and the inorganic particles introduced into the duct.

A further aspect includes, a method of applying inorganic particles to a plugged honeycomb body comprising porous walls, an inlet end and an outlet end, the method comprising flowing the inorganic particles through a Venturi tube and into a duct having a first end and a second end to the plugged honeycomb body to deposit the inorganic particles on the porous walls.

In some embodiments, the method further comprises: generating a flow of air through the duct. In an embodiment, a flow generator is in fluid communication with the duct and the plugged honeycomb body is used to generate a flow of inorganic particles mixed with the flow of air. In an embodiment, the flow generator comprises a fan.

In some embodiments, the method further comprises: flowing the flow of air through a homogenizer plate.

In some embodiments, the method further comprises: drying the inorganic particles prior to flowing the inorganic particles through the Venturi tube.

In some embodiments, the Venturi tube is in communication with a pressurized gas source. In an embodiment, the Venturi tube is in communication with a delivery conduit positioned upstream from the plugged honeycomb body, and the pressurized air source is connected to the delivery conduit.

In some embodiments, the method further comprises: reducing inorganic particle agglomerates prior to flowing the inorganic particles to the Venturi tube. In an embodiment, reducing inorganic particle agglomerates comprises using a roller.

In some embodiments, the method further comprises: drying the inorganic particles prior to flowing the inorganic particles to the Venturi tube.

In some embodiments, the method further comprises: measuring pressure upstream and downstream from the plugged honeycomb body.

Additional aspects of the disclosure are directed to a method of applying inorganic particles to a plugged honeycomb body comprising intersecting porous walls extending from an inlet end to an outlet end of the body and defining axial channels, wherein some of the channels are plugged, the method comprising: aerosolizing a plurality of inorganic primary particles having a particle d50 of between 10 nm and 300 nm, agglomerating at least some of the inorganic primary particles into agglomerates having an agglomerate D50 of between 0.1 micrometer and 5.0 micrometer, and filter depositing the agglomerates on, in, or both on and in, the porous walls of the plugged honeycomb body.

In some embodiments, the aerosolizing comprises passing a suspension of the inorganic primary particles and a carrier fluid through a venturi tube.

In some embodiments, the aerosolizing generates a dry aerosol stream containing the inorganic primary particles. In an embodiment, the carrier fluid is a gas. In an embodiment, the carrier fluid is an essentially dry gas. In an embodiment, the carrier fluid is a liquid. In an embodiment, the carrier fluid comprises a liquid, a gas, or a combination thereof.

In some embodiments, the agglomerating is carried out without any organic binder.

In some embodiments, the inorganic primary particles comprise particles of alumina, cordierite, silicon carbide, or combinations thereof.

In some embodiments, the inorganic primary particles are alumina particles. In an embodiment, the alumina particles have an average BET specific surface area of 5 to 200 m$^2$/g.

One or more aspects of the disclosure are directed to: filtration articles comprising: a plugged honeycomb body; inorganic deposits disposed within the plugged honeycomb filter body having a porosity in a range of greater than 95% to less than or equal to 99.9% and an average thickness in a range of greater than or equal to 0.5 μm to less than or equal to 50 μm; and a clean filtration efficiency of greater than or equal to 85% as measured by a smoke filtration efficiency test. In some embodiments, the filtration article comprises a pressure drop of less than or equal to 5% of a pressure drop of the plugged honeycomb body (that is the bare plugged honeycomb body without the inorganic deposits). In some embodiments, the inorganic deposits disposed within the plugged honeycomb filter body are at a loading of less than or equal to 20 grams of the inorganic deposits per liter of the plugged honeycomb filter body. In some embodiments, the inorganic deposits comprise alumina particles. In some embodiments, the alumina particles have an average BEI specific surface area of 5 to 200 m$^2$/g.

One or more aspects of the disclosure are directed to: filtration articles comprising: a plugged honeycomb body; inorganic deposits disposed within the plugged honeycomb filter body having a porosity in a range of greater than 95% to less than or equal to 99.9% and an average thickness in a range of greater than or equal to 0.5 μm to less than or equal to 50 μm; and a smoke filtration efficiency (FE obtained from smoke test) of greater than or equal to 70% as measured by a smoke filtration efficiency test before being exposed to a durability test; wherein the smoke filtration efficiency after being exposed to the durability test is greater than or equal to 75% of the smoke filtration efficiency before the durability test; and wherein the durability test is selected from the group consisting of: a thermal treatment test, a vibration test, and a high flow test. In some embodiments, the inorganic deposits disposed within the plugged honeycomb filter body are at a loading of less than or equal to 20 grams of the inorganic deposits per liter of the plugged honeycomb filter body. In some embodiments, the inorganic deposits comprise alumina particles. In some embodiments, the alumina particles have an average BET specific surface area of 50 to 200 m$^2$/g.

One or more aspects of the disclosure are directed to: filtration articles comprising: a plugged honeycomb filter body; inorganic deposits disposed within the plugged honeycomb filter body, the inorganic deposits having a porosity in a range of greater than 95% to less than or equal to 99.9% and an average thickness in a range of greater than or equal to 0.5 μm to less than or equal to 50 μm; wherein the filtration article has a clean filtration efficiency of greater than or equal to 85% as measured by a smoke filtration efficiency test. In some embodiments, the filter body is comprised of cordierite, and the inorganic deposits are comprised of alumina, silica, or a combination thereof. In some embodiments, the inorganic deposits are present within the plugged honeycomb filter body at a loading of greater than 0.05 to less than or equal to 20 grams of the inorganic deposits per liter of the plugged honeycomb filter body. In some embodiments, the inorganic deposits comprise alumina particles; in some of these embodiments, the alumina particles have an average BET specific surface area of 5 to 200 m2/g.

One or more aspects of the disclosure are directed to: filtration articles comprising: a plugged honeycomb filter body; inorganic deposits disposed within the plugged honeycomb filter body, the inorganic deposits having a porosity in a range of greater than 95.0% to less than or equal to 99.9% and an average thickness in a range of greater than or equal to 0.5 μm to less than or equal to 50 μm; and a clean filtration efficiency of greater than or equal to 70% as measured by a smoke filtration efficiency test before being exposed to a durability test; wherein the smoke filtration efficiency of the filter body in a clean state, and after being exposed to the durability test, is greater than or equal to 75% of the smoke filtration efficiency of the filter body before the durability test; and wherein the durability test is selected from the group consisting of: a thermal treatment test, a vibration test, and a high flow test. In some embodiments, the inorganic deposits disposed within the plugged honeycomb filter body are present at a loading of greater than 0.05 and less than or equal to 20 grams of the inorganic deposits per liter of the plugged honeycomb filter body; in some of these embodiments, the inorganic deposits comprise alumina particles; in some of these embodiments, the alumina particles have an average BET specific surface area of 5 to 200 m2/g.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Figures 1, 2:
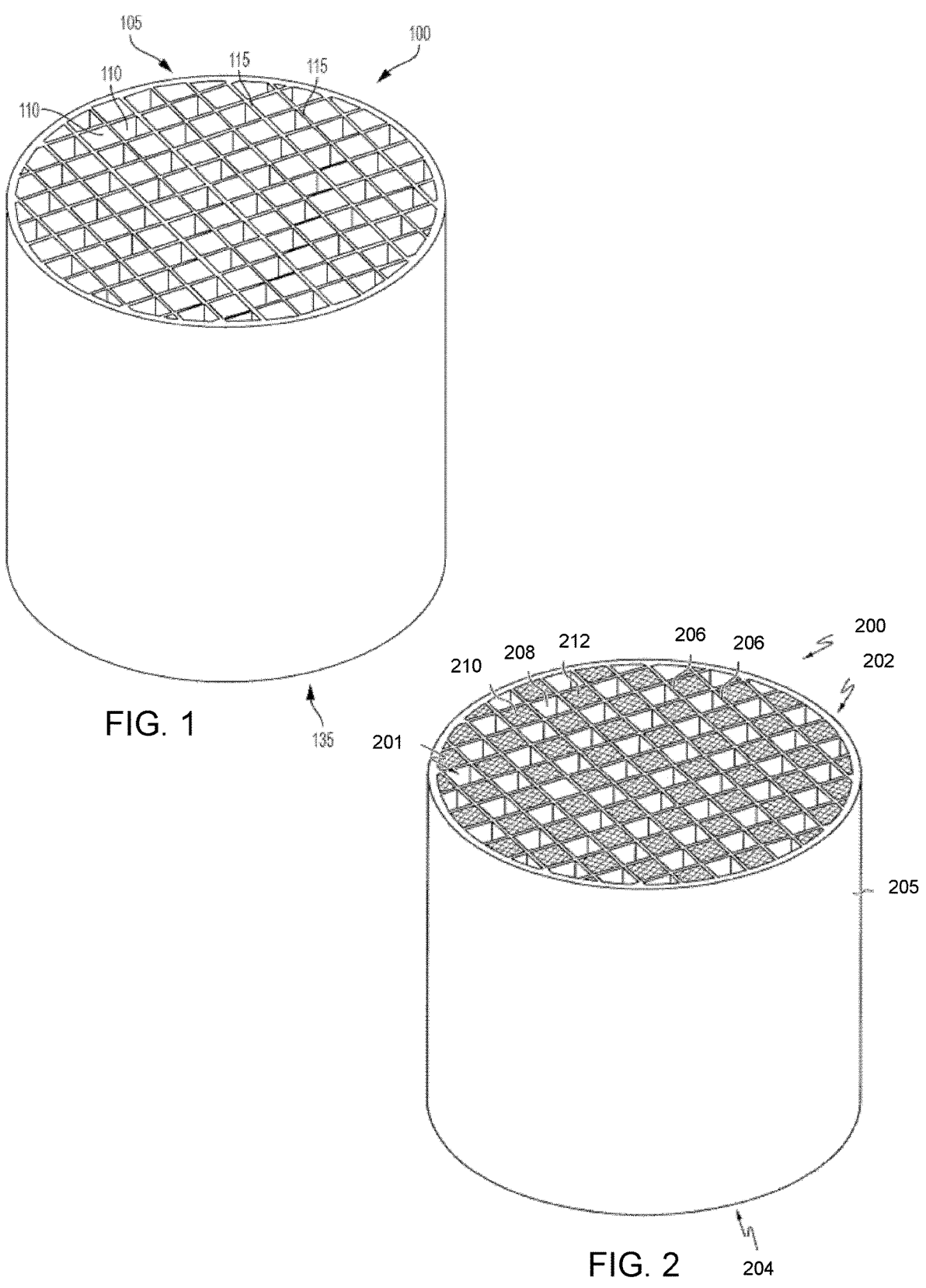
FIG. 1 schematically depicts a honeycomb body.
FIG. 2 schematically depicts a wall-flow particulate filter body according to embodiments disclosed and described herein.

Aspect and methods of the present disclosure relate to application of inorganic particles to a plugged honeycomb body comprising porous walls. With reference now to FIG. 1, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105, which may be an inlet end, and second end 135, which may be an outlet end, of the honeycomb body 100. The honeycomb body may have one or more of the channels plugged on one, or both of the first end 105 and the second end 135, as further described below in reference to FIG. 2. The pattern of plugged channels of the honeycomb body is not limited. In some embodiments, a pattern of plugged and unplugged channels at one end of the plugged honeycomb body may be, for example, a checkerboard pattern where alternating channels of one end of the plugged honeycomb body are plugged. In some embodiments, plugged channels at one end of the plugged honeycomb body have corresponding unplugged channels at the other end, and unplugged channels at one end of the plugged honeycomb body have corresponding plugged channels at the other end.

In one or more embodiments, the plugged honeycomb body may be formed from cordierite, aluminum titanate, enstatite, mullite, forsterite, corundum (SiC), spinel, sapphirine, and periclase, and combinations thereof. In general, cordierite has a composition according to the formula $Mg_2Al_4Si_5O_{18}$. In some embodiments, the pore size of the ceramic material, the porosity of the ceramic material, and the pore size distribution of the ceramic material are controlled, for example by varying the particle sizes of the ceramic raw materials. In addition, pore formers can be included in ceramic batches used to form the honeycomb body with certain porosity.

In some embodiments, walls of the plugged honeycomb body may have an average thickness from greater than or equal to 25 µm to less than or equal to 250 µm, such as from greater than or equal to 45 µm to less than or equal to 230 µm, greater than or equal to 65 µm to less than or equal to 210 µm, greater than or equal to 65 µm to less than or equal to 190 µm, or greater than or equal to 85 µm to less than or equal to 170 µm.

In one or more embodiments, the bulk of the plugged honeycomb body (prior to applying any filtration material) has a median pore size from greater than or equal to 7 µm to less than or equal to 25 µm, such as from greater than or equal to 10 µm to less than or equal to 22 µm, or from greater than or equal to 10 µm to less than or equal to 18 µm. For example, in some embodiments, the bulk of the plugged honeycomb body may have bulk median pore sizes of about 10 µm, about 11 µm, about 12 µm, about 13 µm, about 14 µm, about 15 µm, about 16 µm, about 17 µm, about 18 µm, about 19 µm, or about 20 µm. The term "median pore size" or "d50" (prior to applying any filtration material) refers to a diametrical length measurement, above which the pore sizes of 50% of the pores lie and below which the pore sizes of the remaining 50% of the pores lie, based on the statistical distribution of all the pores.

In specific embodiments, the median pore size (d50) of the bulk of the plugged honeycomb body (prior to applying any filtration material) is in a range of from 10 µm to about 16 µm, for example 13-14 µm, and the d10 refers to a length measurement, above which the pore sizes of 90% of the pores lie and below which the pore sizes of the remaining 10% of the pores lie, based on the statistical distribution of all the pores is about 7 µm. In specific embodiments, the d90 refers to a length measurement, above which the pore sizes of 10% of the pores of the bulk of the plugged honeycomb body (prior to applying any filtration material) lie and below which the pore sizes of the remaining 90% of the pores lie, based on the statistical distribution of all the pores is about 30 µm. In specific embodiments, the median diameter (D50) of the secondary particles or agglomerates is about 2 micrometers. In specific embodiments, it has been determined that when the agglomerate median size D50 and the median wall pore size of the bulk honeycomb body d50 is such that there is a ratio of agglomerate median size D50 to median wall pore size of the bulk honeycomb body d50 is in a range of from 5:1 to 16:1, excellent filtration efficiency results and low pressure drop results are achieved. In more specific embodiments, a ratio of agglomerate median size D50 to median wall pore size of the bulk of honeycomb body d50 (prior to applying any filtration material) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In some embodiments, the bulk of the plugged honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography; these two methods in particular are valuable for measuring surface porosity and bulk porosity independent from one another. In one or more embodiments, the bulk porosity of the plugged honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In some embodiments, the surface of the plugged honeycomb body may have surface porosities, prior to application of a filtration material deposit, of from greater than or equal to 35% to less than or equal to 75% as measured by SEM or X-ray tomography. In one or more embodiments, the surface porosity of the plugged honeycomb body may be less than 65%, such as less than 60%, less than 55%, less than 50%, less than 48%, less than 46%, less than 44%, less than 42%, less than 40%, less than 48%, or less than 36% for example.

Figure 3:
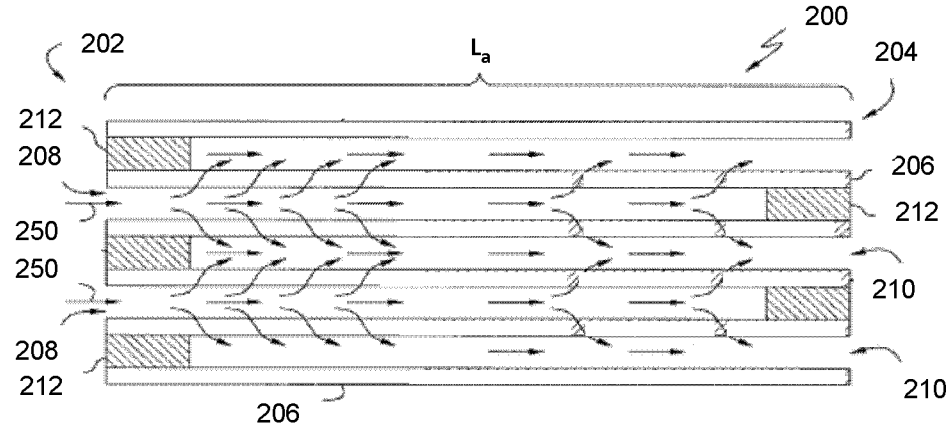
FIG. 3 is a cross-sectional longitudinal view of a portion of the particulate filter body shown in FIG. 2.

Referring now to FIGS. 2 and 3, a plugged honeycomb body, or plugged honeycomb particulate filter body 200 is schematically depicted. The particulate filter body 200 may be used as a wall-flow filter to filter particulate matter from an exhaust gas stream 250, such as an exhaust gas stream emitted from a gasoline engine, in which case the particulate filter body 200 is in the form of a gasoline particulate filter. The particulate filter body 200 generally comprises a honeycomb body having a plurality of channels 201 or cells which extend between an inlet end 202 and an outlet end 204, defining an overall length La (shown in FIG. 3). The channels 201 of the particulate filter body 200 are formed by, and at least partially defined by a plurality of intersecting channel walls 206 that extend from the inlet end 202 to the outlet end 204. The particulate filter body 200 may also include a skin layer 205 surrounding the plurality of channels 201. This skin layer 205 may be extruded during the formation of the channel walls 206 or formed in later processing as an after-applied skin layer, such as by applying a skinning cement to the outer peripheral portion of the channels.

An axial cross section of the particulate filter body 200 of FIG. 2 is shown in FIG. 3. In some embodiments, certain channels are designated as inlet channels 208 and certain other channels are designated as outlet channels 210. In some embodiments of the particulate filter body 200, at least a first set of channels is plugged with plugs 212. Generally, the plugs 212 are disposed proximate the ends (i.e., the inlet end and/or the outlet end) of the channels 201. The plugs are arranged in a pre-defined pattern, such as in the checkerboard pattern shown in FIG. 2 with every other channel being plugged at an end. The inlet channels 208 may be plugged at or near the outlet end 204, and the outlet channels 210 may be plugged at or near the inlet end 202 on channels not corresponding to the inlet channels, as depicted in FIG. 3. Accordingly, each cell may be plugged at or near one end of the particulate tilter only.

While FIG. 2 generally depicts a checkerboard plugging pattern, it should be understood that alternative plugging patterns may be used in the porous ceramic honeycomb article. In the embodiments described herein, the particulate filter body 200 may be formed with a channel density of up to about 600 channels per square inch (cpsi). For example, in some embodiments, the particulate filter 200 may have a channel density in a range from about 100 cpsi to about 600 cpsi. In some other embodiments, the particulate filter 200 may have a channel density in a range from about 100 cpsi to about 400 cpsi or even from about 200 cpsi to about 300 cpsi.

In the embodiments described herein, the channel walls 206 of the particulate filter body 200 may have a thickness of greater than about 4 mils (101.6 micrometers). For example, in some embodiments, the thickness of the channel walls 206 may be in a range from about 4 mils up to about 30 mils (762 micrometers). In some other embodiments, the thickness of the channel walls 206 may be in a range from about 7 mils (177.8 micrometers) to about 20 mils (508 micrometers).

In some embodiments of the particulate filter body 200 described herein the channel walls 206 of the particulate filter body 200 may have a bare open porosity (i.e., the porosity before any coating is applied to the plugged honeycomb body) % P≥35% prior to the application of any coating to the particulate filter body 200. In some embodiments the bare open porosity of the channel walls 206 may be such that 40%≤% P≤75%. In other embodiments, the bare open porosity of the channel walls 206 may be such that 45%≤% P≤75%, 50%≤% P≤75%, 55%≤% P≤75%, 60%≤% P≤75%, 45%≤% P≤70%, 50%≤% P≤70%, 55%≤% P≤70%, or 60%≤% P≤70%.

Further, in some embodiments, the channel walls 206 of the particulate filter body 200 are formed such that the pore distribution in the channel walls 206 has a median pore size of ≤30 micrometers prior to the application of any coatings (i.e., bare). For example, in some embodiments, the median pore size may be ≥8 micrometers and less than or ≤30 micrometers. In other embodiments, the median pore size may be ≥10 micrometers and less than or ≤30 micrometers. In other embodiments, the median pore size may be ≥10 micrometers and less than or ≤25 micrometers. In some embodiments, particulate filters produced with a median pore size greater than about 30 micrometers have reduced filtration efficiency while with particulate filters produced with a median pore size less than about 8 micrometers may be difficult to infiltrate the pores with a washcoat containing a catalyst. Accordingly, in some embodiments, it is desirable to maintain the median pore size of the channel wall in a range of from about 8 micrometers to about 30 micrometers, for example, in a range of rom 10 micrometers to about 20 micrometers.

In one or more embodiments described herein, the plugged honeycomb body of the particulate filter body 200 is formed from a metal or ceramic porous material such as, for example, cordierite, silicon carbide, aluminum oxide, aluminum titanate or any other ceramic material suitable for use in elevated temperature particulate filtration applications. For example, the particulate filter body 200 may be formed from cordierite by mixing a batch of ceramic precursor materials which comprise constituent materials suitable for producing a ceramic article which when fired predominately comprises a cordierite crystalline phase. Constituent materials suitable for cordierite formation include a combination of inorganic components including talc, a silica-forming source, and an alumina-forming source. The batch mixture may additionally comprise clay, such as, for example, kaolin clay. The cordierite precursor batch composition may also contain organic components, such as organic pore formers, which are added to the batch mixture to achieve the desired pore size distribution upon firing. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the plugged honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture.

After the batch of ceramic precursor materials is mixed with the appropriate processing aids, the batch of ceramic precursor materials is extruded and cut and dried to form a green honeycomb body comprising an inlet end and an outlet end with a plurality of channel walls extending between the inlet end and the outlet end. Thereafter, the green honeycomb body is fired according to a firing schedule suitable for producing a fired ceramic honeycomb body. At least a first set of the channels of the fired ceramic honeycomb body are then plugged in a predefined plugging pattern with a ceramic plugging composition. The plugs of the honeycomb body can then be dried or cured, or the fired honeycomb body can be fired again to ceram the plugs, in order to secure the plugs and seal the respective channels.

Figure 4:
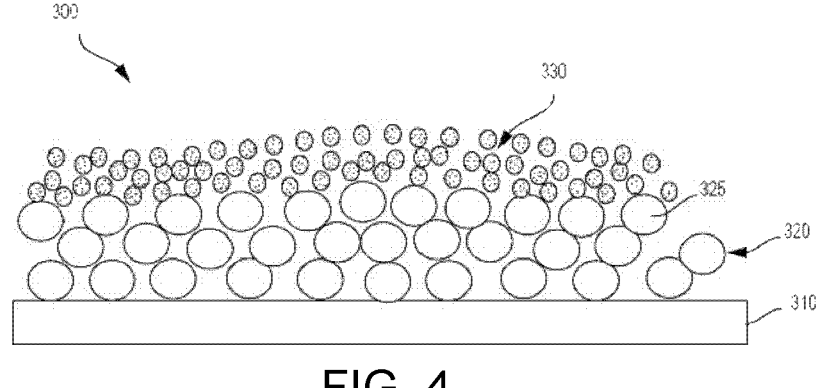
FIG. 4 schematically depicts a portion of a wall of a honeycomb body of a particulate filter with particulate loading according to the present disclosure.

In various embodiments the plugged honeycomb body is configured to filter particulate matter from a gas stream, for example, an exhaust gas stream from a gasoline engine. Accordingly, the median pore size, porosity, geometry and other design aspects of both the bulk and the surface of the plugged honeycomb body are provided taking into account these filtration requirements of the filter body. As an example, and as shown in the embodiment of FIG. 4, a wall 310 of the plugged honeycomb body 300, which can be a portion of the part as shown in FIGS. 2 and 3, has filtration material deposits 320 disposed thereon, which in some embodiments rests on the walls, and optionally may be sintered or cured or otherwise bonded by heat treatment. The filtration material deposits 320 comprise particles 325 that are deposited on the wall 310 of the plugged honeycomb body 300 and help prevent particulate matter, such as, for example, soot and/or ash, from exiting the plugged honeycomb body along with the gas stream 330, and to help prevent the particulate matter from clogging the base portion of the walls 310 of the plugged honeycomb body 300. In this way, and according to embodiments herein, the filtration material deposits 320 can serve as a filtration component while the base portion of the plugged honeycomb body also filters and can be also configured to otherwise minimize pressure drop for example as compared to honeycomb bodies without such filtration material deposits. The filtration material deposits are delivered by the apparatus and deposition methods disclosed herein.

The filtration or deposited material, which in some portions or some embodiments may be inorganic deposits or an inorganic layer or membrane or islands or agglomerates, disposed in and/or on walls of the plugged honeycomb body can be very thin compared to thickness of the base portion of the walls of the plugged honeycomb body. In some embodiments, in or on one or more portions of the walls of the honeycomb body, the average thickness of the material, which may be deposit regions or an inorganic layer or membrane, on the base portion of the walls of the plugged honeycomb body is greater than or equal to 0.5 μm and less than or equal to 50 μm, or greater than or equal to 0.5 μm and less than or equal to 45 μm, greater than or equal to 0.5 μm and less than or equal to 40 μm, or greater than or equal to 0.5 μm and less than or equal to 35 μm, or greater than or equal to 0.5 μm and less than or equal to 30 μm, greater than or equal to 0.5 μm and less than or equal to 25 μm, or greater than or equal to 0.5 μm and less than or equal to 20 μm, or greater than or equal to 0.5 μm and less than or equal to 15 μm, greater than or equal to 0.5 μm and less than or equal to 10 μm. In one or more embodiments, the inorganic material comprises alumina. In one or more embodiments, the inorganic deposits have a porosity as measured by mercury intrusion porosimetry, SEM, or X-ray tomography in a range of from greater than 95% to less than or equal to 99.9%, or from greater than or equal 95.5% to less than or equal 99.85%, or from greater than or equal 96% to less than or equal 99.8%, or from greater than or equal 96.5% to less than or equal 99.75%, or from greater than or equal 97% to less than or equal 99.7%, or from greater than or equal 97.5% to less than or equal 99.65%, or from greater than or equal 98% to less than or equal 99.6%, or from greater than or equal 98.5% to less than or equal 99.55%, or from greater than or equal 99% to less than or equal 99.5%, and all values and subranges therebetween. In one or more embodiments, the inorganic deposits disposed within the honeycomb filter body are at a loading of less than or equal to 20 grams of the inorganic deposits per liter of the honeycomb filter body, or of less than or equal to 15 grams of the inorganic deposits per liter of the honeycomb filter body, or less than or equal to 10 grams of the inorganic deposits per liter of the honeycomb filter body, less than or equal to 7 grams of the inorganic deposits per liter of the honeycomb filter body, or less than or equal to 5 grams of the inorganic deposits per liter of the honeycomb filter body. In some embodiments, an increase in pressure drop across the honeycomb due to the application of the inorganic deposits is less than 20% of the pressure drop of the uncoated honeycomb. In other embodiments that increase can be less than or equal to 9%, or less than or equal to 8%. In other embodiments, the pressure drop increase across the honeycomb body is less than or equal to 7%, such as less than or equal to 6%. In still other embodiments, the pressure drop increase across the honeycomb body is less than or equal to 5%, such as less than or equal to 4%, or less than or equal to 3%.

Figure 5:
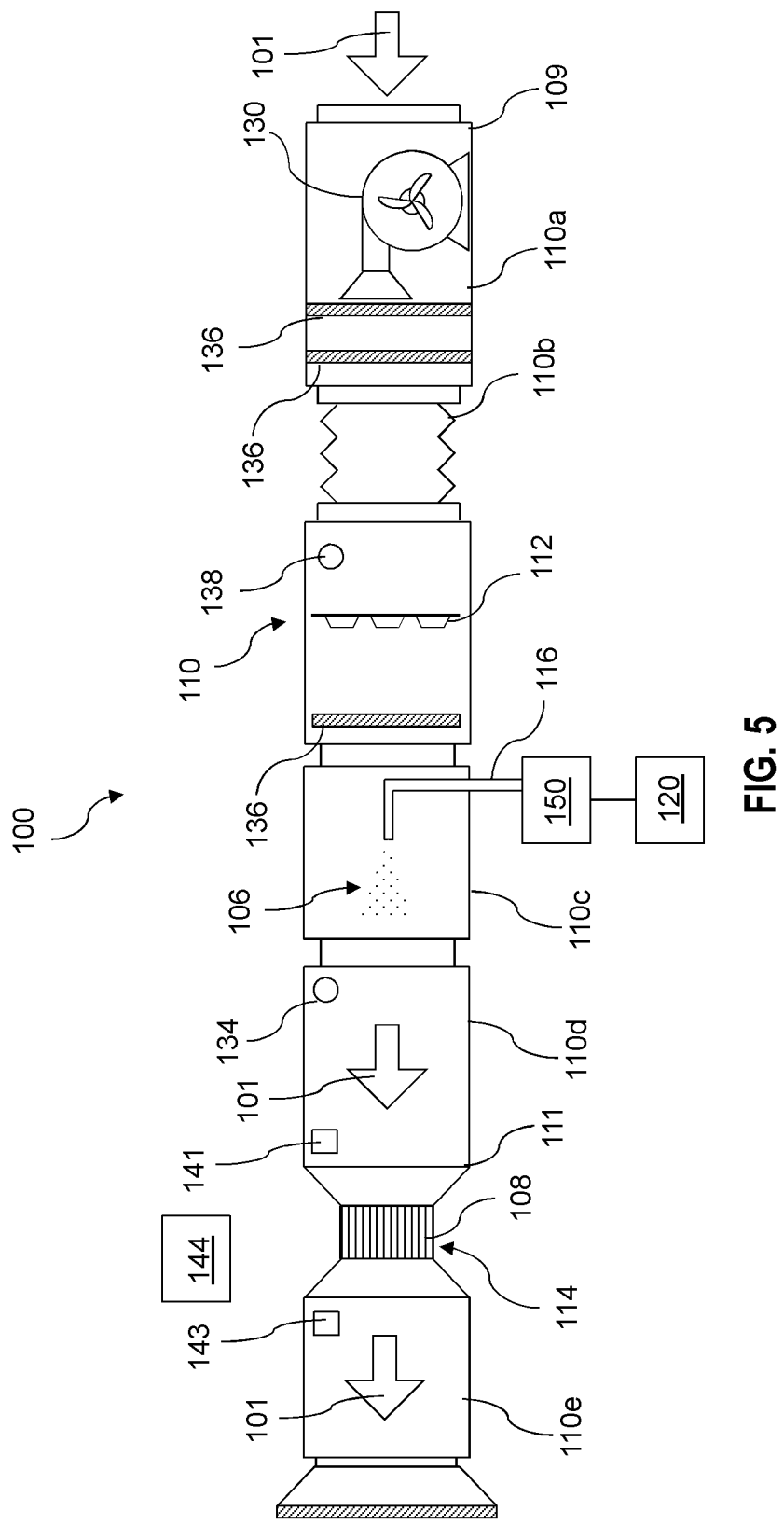
FIG. 5 schematically depicts an apparatus configured to deposit inorganic particles on a plugged honeycomb body according to an embodiment of the present disclosure.

Referring now to FIG. 5, an embodiment of an apparatus 100 configured to apply inorganic particles 407 to a plugged honeycomb body 108 is shown. In one or more embodiments, the plugged honeycomb body is the type shown in FIGS. 2 and 3, and the plugged honeycomb body 108 comprises porous walls, an inlet end and an outlet end. The apparatus 100 shown in FIG. 5 comprises a duct 110 spanning from a first end to a second end 111. The duct 110 can comprise a single unitary section of duct, or a plurality of duct sections 110a, 110b, 110c, and 110d as shown in FIG. 5. The plurality of duct sections 110a, 110b, 110c, and 110d can be joined together by collars or other suitable joining. One or more of the duct sections 110a, 110b, 110c, and 110d can comprise rigid duct material or flexible duct material.

The apparatus further comprises a deposition zone 114 configured to house the plugged honeycomb body 118 and to be in fluid communication with the second end 111 of the duct 110. An inlet conduit 116 is in fluid communication with the duct 110. In the embodiments shown, the inlet conduit 116 is located upstream from the deposition zone 114. In FIG. 5, the arrows 101 depict a direction of gas (e.g., air) flow through the apparatus 100, in particular through the duct 110, the deposition zone 114 and the plugged honeycomb body 108. The term "upstream" refers to a position or location in the apparatus that encounters flow before another position or location in the apparatus. Likewise, "downstream" refers to a position or location in the apparatus that encounters flow after another position or location in the apparatus. Thus, the first end 109 of the duct 110 encounters flow through the apparatus prior to the second end 111 of the duct 110, and the second end 111 of the duct 110 encounters flow through the apparatus prior to the deposition zone 114.

Figures 6, 7:
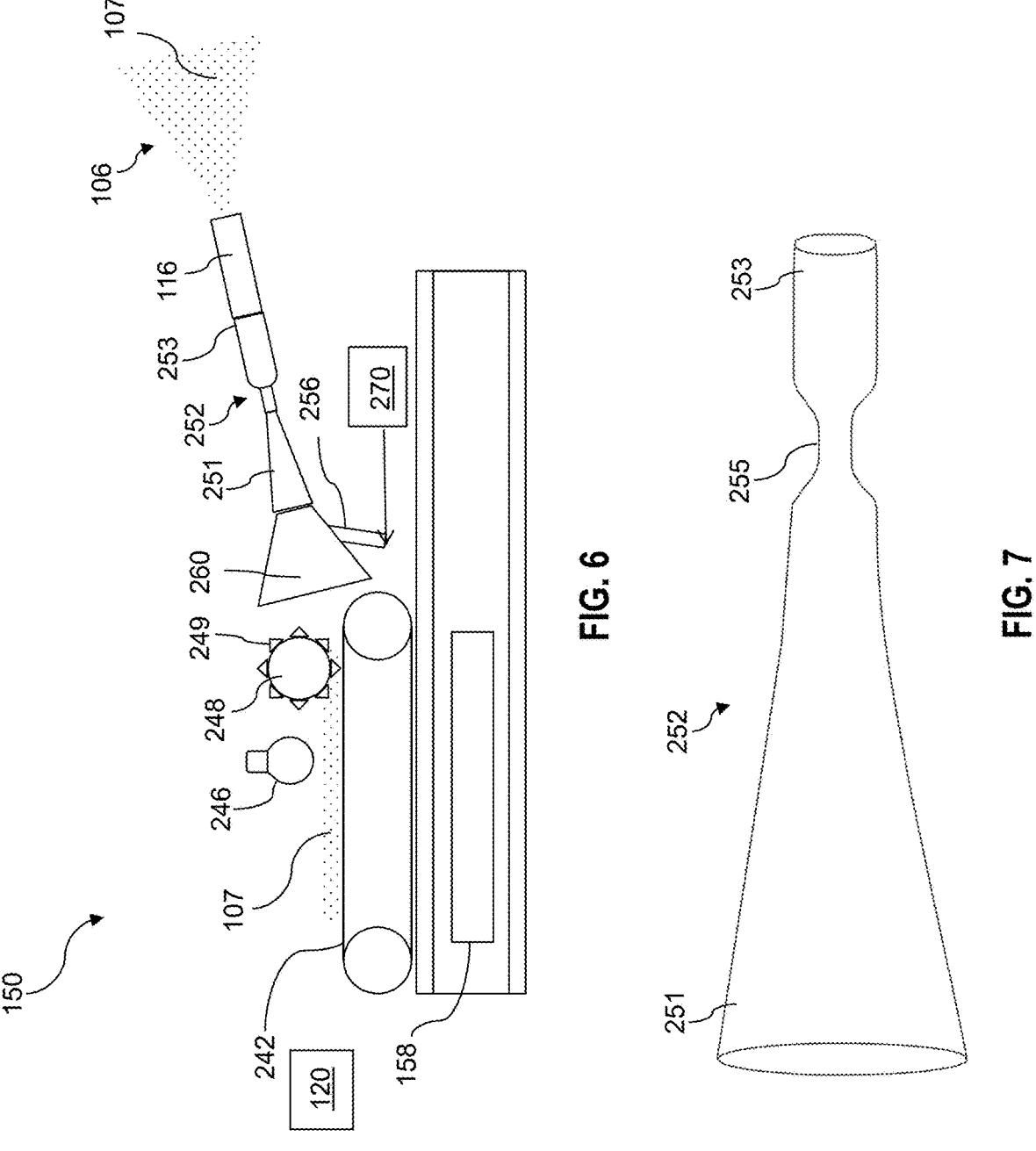
FIG. 6 schematically depicts an aerosol generator according to an embodiment of the present disclosure.
FIG. 7 schematically depicts a Venturi tube used in an aerosol generator shown in FIG. 6 according to an embodiment of the present disclosure.

In the embodiment shown in FIG. 5, an inorganic particle source 120 is in fluid communication with the inlet conduit 116 and configured to supply inorganic particles 107 to the inlet conduit 116 and into the duct 110. An aerosol generator 150 comprising a Venturi tube 252 (as shown in FIG. 7) comprising a first end 251 and a second end 253 is in fluid communication with the inlet conduit 116. The aerosol generator 150 is configured to deliver an aerosol stream 106 comprising the inorganic particles 107 and gas (e.g., air) to the deposition zone 114.

Continuing with the embodiment shown in FIG. 5, a flow generator 130 is in fluid communication with the duct 110 and the deposition zone 114, the flow generator 130 being configured to establish a flow of a gas (e.g., air) and the inorganic particles 107 introduced into the duct 110 by the aerosol generator 150. Non-limiting examples of a flow generator 130 include a fan, a blower and/or a vacuum pump, which establishes a fluid flow, such as a gas flow (e.g., an air flow, nitrogen flow, or inert gas flow) in the direction of arrows 101.

In one or more embodiments, the aerosol generator 150 is configured to deliver a dry aerosol to the deposition zone 114. According to one or more embodiments, "dry aerosol" refers to an aerosol comprising a gas, such as air, and inorganic particles. In some embodiments, a dry aerosol consists essentially of inorganic particles and a gas, such as air, and no binder or added liquid is contained in the aerosol. In some embodiments, the dry aerosol may comprise a small amount of liquid or moisture, such as from ambient conditions, for example from 0.0001% to 5% by weight of the inorganic particle weight, from 0.0001% to 4% by weight, from 0.0001% to 3% by weight, from 0.0001% to 2% by weight, from 0.0001% to 1% by weight, from 0.0001% to 0.5% by weight, from 0.0001% to 0.4% by weight, from 0.0001% to 0.3% by weight, from 0.0001% to 0.2% by weight, from 0.0001% to 0.1% by weight, from 0.0001% to 0.01% by weight, or 0% liquid or moisture.

Figure 8:
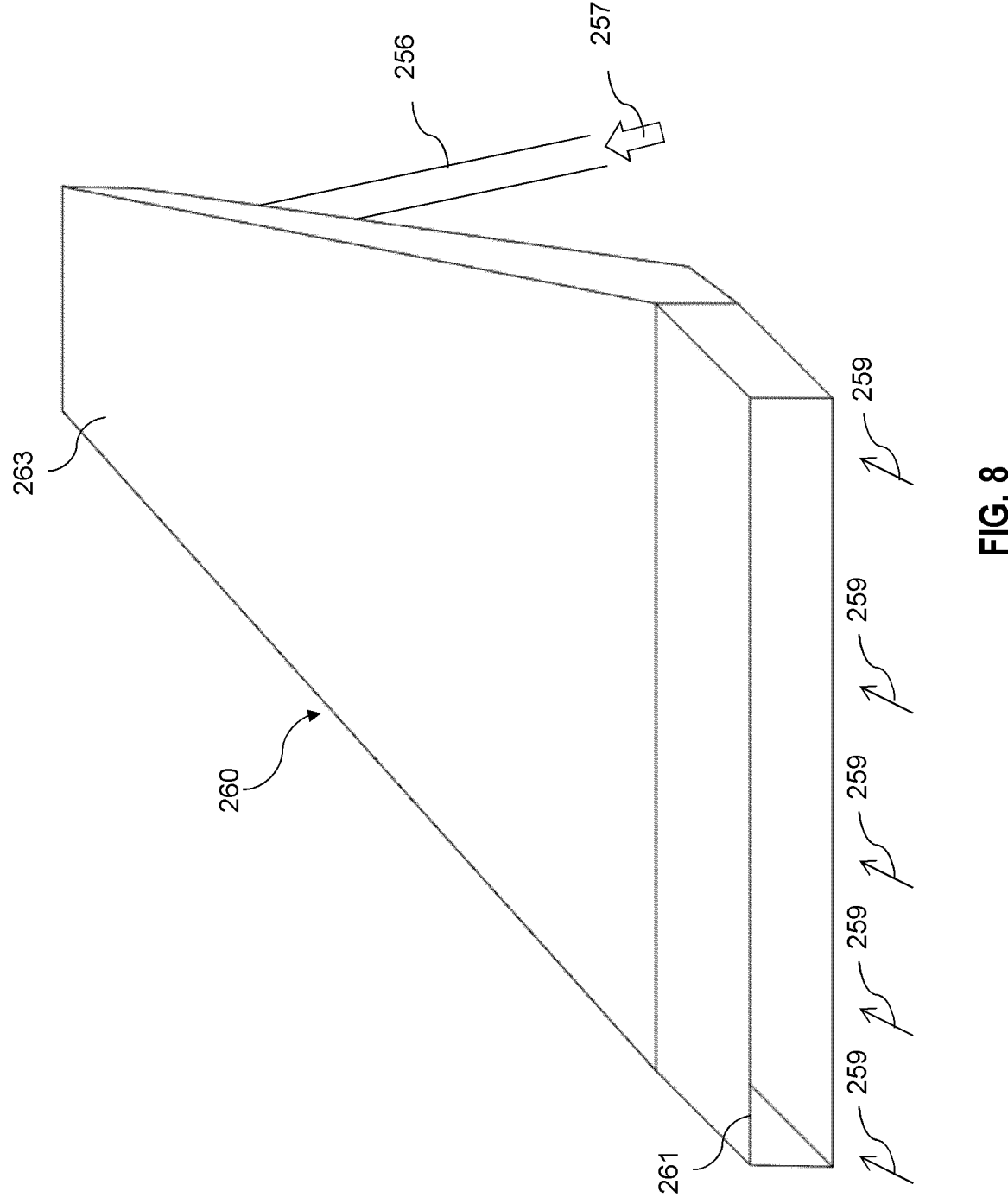
FIG. 8 is an isometric view of a portion of the aerosol generator shown in FIG. 6.

As shown in FIG. 6 and FIG. 8, the aerosol generator 150 further preferably comprises a delivery conduit 260 having a flared first end 261 configured to receive the inorganic particles 107 from the inorganic particle source 120. The delivery conduit 260 further comprises a second end 263 connected to the first end 251 of the Venturi tube 252, and a second end 253 of the Venturi tube 252 is connected to the inlet conduit 116. In the embodiment shown, the apparatus 100 further comprises pressurized gas source 270 in communication with the delivery conduit 260. In the embodiment shown, the pressurized gas source 270 may comprise a tank or cylinder of gas, such as air or nitrogen. The tank or cylinder can include a pressure regulator to regulate the flow of pressurized gas into a gas conduit 256. In some embodiments, the pressurized gas source 270 comprises an air compressor.

Referring now to FIG. 7, the Venturi tube 252 includes a reduced cross-sectional area portion 255 between the first end 251 and the second end of the Venturi tube. In a Venturi tube, when a fluid such as a gas and/or liquid or an aerosol comprised of a fluid such as a gas and/or liquid flows through the Venturi tube, a "Venturi effect" can be generated. The Venturi effect is the reduction in fluid pressure that results when a fluid or aerosol flows through a constricted section (or choke) of a pipe.

Referring back to FIG. 6, the aerosol generator 150 of the apparatus 100 further comprises an inorganic particle feed system 242 configured to deliver the inorganic particles 107 from the inorganic particle source 120 to the inlet conduit 116. The inorganic particles 107 from the inorganic particle source 120 in some embodiments are introduced to the delivery conduit by the inorganic particle feed system 242, which in the embodiment shown is a conveyor. The inorganic particle feed system 242 according to one or more embodiments comprises a gravity feed system, a screw auger, a belt conveyor, a chain conveyor, or other suitable device to introduce the inorganic particles 107 to the delivery conduit 260.

FIG. 8 shows an isometric view of the delivery conduit 260 according to one or more embodiments. The high pressure flow of gas indicated by arrow 257 through the gas conduit 256 causes gas to flow through the flared end 261 of delivery conduit 260 as shown by arrows 259 adjacent the flared end 261. This flow of gas indicated by arrows 259 entrains, draws up or sucks up particles 107 from inorganic particle feed system 242 into the flared end 261 of the delivery conduit 260 and out the second end 263 of the delivery conduit 260. The inorganic particles 107 then enter the Venturi tube 252 wherein the particles are mixed with gas and form an aerosol 106 comprised of the inorganic particles 107 and the gas, and the aerosol 106 is delivered into the duct 110 at duct section 110c through the inlet conduit 116. The flow of gas (e.g., air) in the duct 110 indicated by arrows 101 causes the aerosol 106 comprising the inorganic particles 107 in the duct 110 to be transported to the plugged honeycomb body 108 located in the deposition zone. Gas flows through the plugged honeycomb body and into an exit duct section 110.

In the embodiment shown in FIG. 5 and FIG. 6, the apparatus further preferably includes a drying apparatus 246 configured to dry the inorganic particles 107. In the embodiment shown, the drying apparatus 246 is positioned upstream from the delivery conduit 260. The aerosol generator 150 according to one or more embodiments further preferably comprises a agglomerate reducing device, which in the embodiment shown is a roller 248 having ridges 249 on the outer periphery of the roller to break up or pulverize agglomerates and reduce agglomerates of the inorganic particles 107 before being drawn or sucked into the delivery conduit 260. The roller 248 is positioned upstream from the delivery conduit 260. In the embodiment shown, flow generator 130 is positioned at the inlet end 109 of the duct 110 and upstream from the inlet conduit 116. In some embodiments the flow generator is positioned in or adjacent the exit duct section 110e, and gas (e.g., air) flow can be generated in the same direction shown by arrows 101 by directing the fan to draw or suck air through the duct 110.

When high pressure air is forced into the delivery conduit, lightweight inorganic particles at the entrance of the delivery conduit are inhaled due to the negative pressure created by Venturi effect. The aerosol is sheared and exits the Venturi tube into the duct 110. When the aerosol is delivered into the duct 110, the gas volume expands and the flow speed of the inorganic particles 107 is rapidly reduced. The aerosol is then dispersed and carried through the duct 110 preferably by laminar air flow provided by the flow generator 130. The inorganic particles 107 are directed into and onto the porous walls of the plugged honeycomb body. According to some embodiments of the present disclosure, no heat is required to post-treat the honeycomb body after deposition of the inorganic particles; in other embodiments the honeycomb body, and more particularly the inorganic particles, are heat treated, such as to sinter or cure or otherwise adhere the inorganic particles to the porous wall structure.

Embodiments of the apparatus further preferably comprise a homogenizer plate 112 configured to homogenize flow of gas through the duct 110. One or more filters 136, for example HEPA filters are preferably positioned in sections of the duct 110 to filter particles from the gas drawn through the duct by the flow generator 130.

In some embodiments, the apparatus 100 further preferably comprises a first pressure sensor 141 located upstream from the deposition zone 114 and a second pressure sensor 143 positioned downstream from the deposition zone 114. The apparatus of some embodiments further preferably comprises a humidity sensor 138 and a mass flow controller 134. The first pressure sensor 141 and the second pressure sensor 143 are in some embodiments in communication with a processor 144 which measures a differential pressure between the first pressure sensor 141 and the second pressure sensor 143. In one or more embodiments, the processor 144 may be integral with and/or wired to the first pressure sensor 141 and the second pressure sensor 143, or separate from the first pressure sensor 141 and the second pressure sensor 143. The humidity sensor 138 and the mass flow controller in some embodiments are in communication with the processor 144. In some embodiments the processor 144 comprises includes a central processing unit (CPU), a memory, and support circuits. The processor 144 may be a general-purpose computer processor that can be used in an industrial setting monitoring pressure and calculating a pressure differential between pressure sensors. The memory, or computer readable medium of the processor 144 may be one or more of readily available memory such as random access memory (RAM), read only memory (ROM), floppy disk, hard disk, optical storage media (e.g., compact disc or digital video disc), flash drive, or any other form of digital storage, local or remote. The support circuits are coupled to the CPU for supporting the processor 144. These circuits include cache, power supplies, clock circuits, input/output circuitry and subsystems. One or more processes may be stored in the memory as a software routine that may be executed or invoked to control the operation of the first pressure sensor 141 and the second pressure sensor 143 in the manner described herein. In some embodiments, the processor 144 receives readings from the mass flow controller and the humidity sensor 138, and the processor 144. A control panel 158 on the aerosol generator 150 is also in communication with the processor 144.

Another aspect of the disclosure pertains to a method of applying inorganic particles to a plugged honeycomb body comprising porous walls, an inlet end and an outlet end, the method comprising flowing the inorganic particles through a Venturi tube and into a duct having a first end and a second end to the plugged honeycomb body to deposit the inorganic particles on the porous walls. In one or more embodiments the method is performed in the apparatus shown in FIGS. 5-8.

One or more embodiments of the method further comprise introducing a flow of air through the duct. This can be accomplished using the flow generator shown in FIG. 5, for example a fan, a blower or a vacuum. In some embodiments, a flow generator in fluid communication with the duct and the plugged honeycomb body is used to generate a flow of inorganic particles mixed with the flow of air. Embodiments of the method preferably include flowing the flow of air through a homogenizer plate, for example the homogenizer plate 112.

In some embodiments, the method further comprises optionally drying the inorganic particles prior to flowing the inorganic particles through the Venturi tube, for example with the drying apparatus 246 shown in FIG. 6. As shown in FIG. 6, the Venturi tube 252 is in communication with a pressurized gas source 270. For example, in some method embodiments, the pressurized Venturi tube 252 with the inlet conduit 116 positioned upstream from the plugged honeycomb body 108, and the pressurized air source 270 is connected to the delivery conduit 260.

Embodiments of the method further comprise reducing inorganic particle agglomerates prior to flowing the inorganic particles to the Venturi tube. As described above, the agglomerates are reduced in some embodiments using a roller 248. Some embodiments of the method further comprise measuring pressure upstream and downstream from the plugged honeycomb body.

In exemplary embodiments, the inorganic particle feed system 242 comprises a chain conveyor having four speed modes ranging from 1.25 to 4.0 cm/min, to precisely control the rate of inorganic particle loading. In some embodiments, a plurality of homogenizer plates 112 may be provided, which can be in the form of orifice plates inside the duct to provide for flow lamination and uniformity. In a specific embodiment, there are four homogenizer plates in the duct 110. Temperature and humidity monitors and pressure sensors provide a way to monitor the running conditions. In specific embodiments, the compressed air pressure was 3.0 bar, the roller was rotated at rate of 2.7-3.3 revolutions per minute and the chain conveyor speed was varied between 1.25 and 4.0 cm/min. The flow generator provided an air flow rate ranging from 10 to 40 $Nm^3$/hour in a square duct that was 7 meters in length between the flow generator to the exhaust duct section 110e.

According to one or more embodiments, GPF filters can be modified with a surface treatment by depositing small agglomerates of inorganic particles (e.g., alumina powder) onto and/or into the walls channels of a GPF filter or filter body. As the agglomerates deposit onto the inlet channels of the filter they act to occupy pores in the microstructure of the channel walls. During the build-up of the agglomerates the initial (essentially clean) filtration efficiency of the filter increases from its base value (~50%) to a much higher values, even greater than 90%.

Commercially available inorganic particles can be used as a raw material in the formation of an inorganic material in the form of inorganic particles for depositing on a plugged honeycomb body. According to one or more embodiments, the particles are selected from $Al_2O_3$, $SiO_2$, $TiO_2$, $CeO_2$, $ZrO_2$, SiC, MgO, $CaCO_3$, and combinations thereof.

In one or more embodiments, the particles have a average primary particle size in a range of from about 10 nm to about 4 micrometers, about 20 nm to about 3 micrometers or from about 50 nm to about 2 micrometers, or from about 50 nm to about 900 nm or from about 50 nm to about 600 nm. In specific embodiments, the average primary particle size is in a range of from about 100 nm to about 200 nm, for example, 150 nm. The average primary particle size can be determined as a calculated value rom the BET surface area of the aerosol particles, which in some embodiments is 10 $m^2$/g.

In one or more embodiments, the primary particles comprise a ceramic particle such as a ceramic particle or an oxide particle, for example $Al_2O_3$, $SiO_2$, MgO, $CeO_2$, $ZrO_2$, CaO, $TiO_2$, cordierite, mullite, SiC, aluminum titanate, $CaCO_3$, and mixtures thereof.

Figure 9:
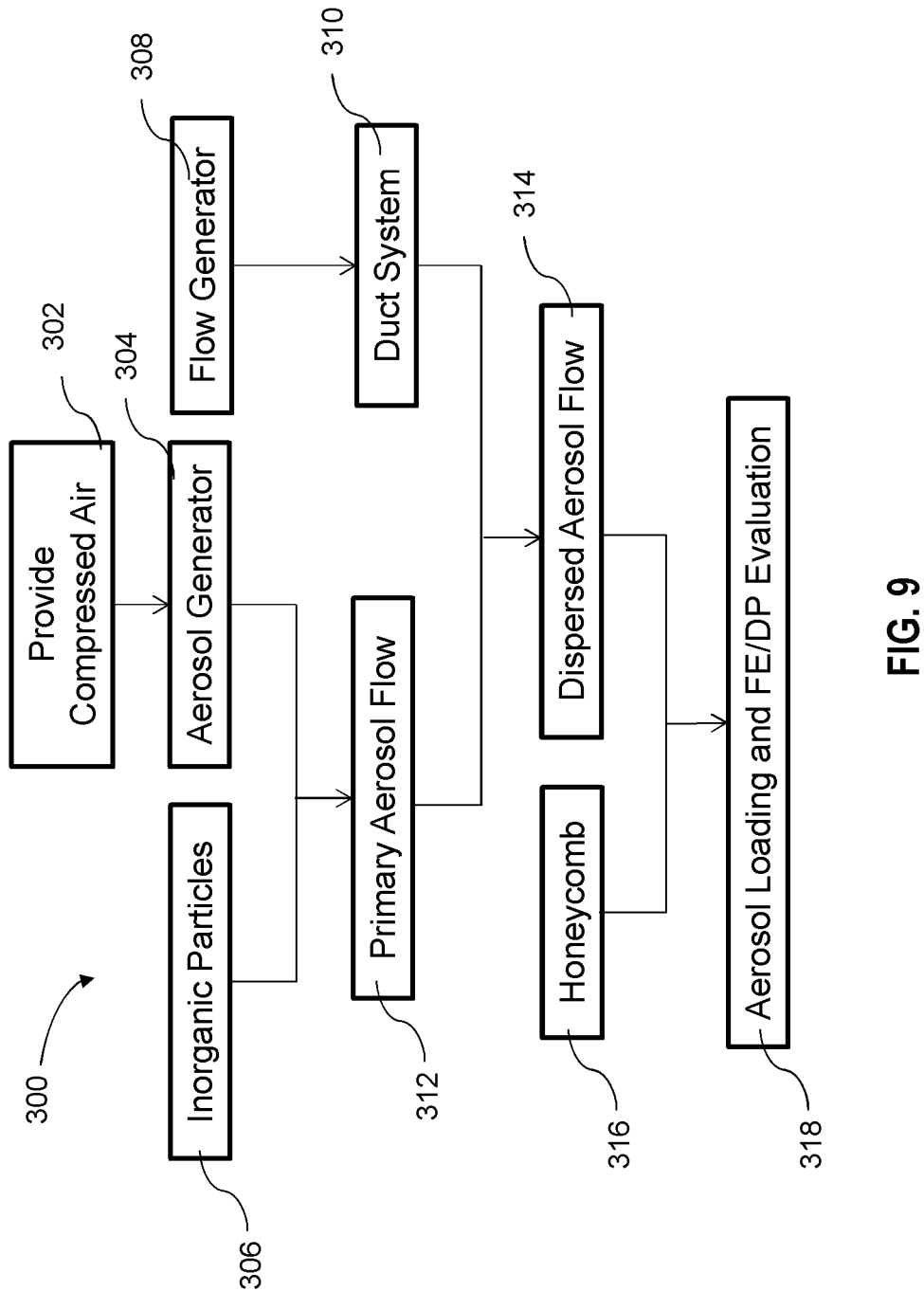
FIG. 9 is a flowchart of an exemplary embodiment of a method according to the present disclosure.

FIG. 9 shows a flow diagram of components of method embodiments. Method 300 comprises providing compressed gas such as compressed air at 302. The compressed air is flowed to an aerosol generator at 304 as described above. Inorganic particles are supplied to the aerosol generator at 306. At 308 a flow generator is placed in flow or fluid communication with a duct system as described with respect to FIG. 5. Aerosol flow is established by the aerosol generator at 312. The flow of gas such as air provides a dispersed aerosol flow at 314 in the duct system 110. A plugged honeycomb body provided at 316 is contacted with the dispersed aerosol flow, causing aerosol loading at 318 and filtration efficiency and different pressure are evaluated.

Example

An apparatus as shown and described with respect to FIGS. 5-8 included a chain conveyor having four speed modes ranging from 1.25 to 4.0 cm/min, to precisely control the rate of inorganic particle loading. Four homogenizer plates in the form of orifice plates inside the duct were utilized to provide flow lamination and uniformity. Temperature and humidity monitors and pressure sensors provided a way to monitor the running conditions. The compressed air pressure was 3.0 bar, the roller was rotated at rate of 2.7-3.3 revolutions per minute and the chain conveyor speed was varied between 1.25 and 4.0 cm/min. The flow generator provided an air flow rate ranging from 10 to 40 $Nm^3$/hour in a square duct that was 7 meters in length between the flow generator to the exhaust duct section 110e.

Figures 10A, 10B:
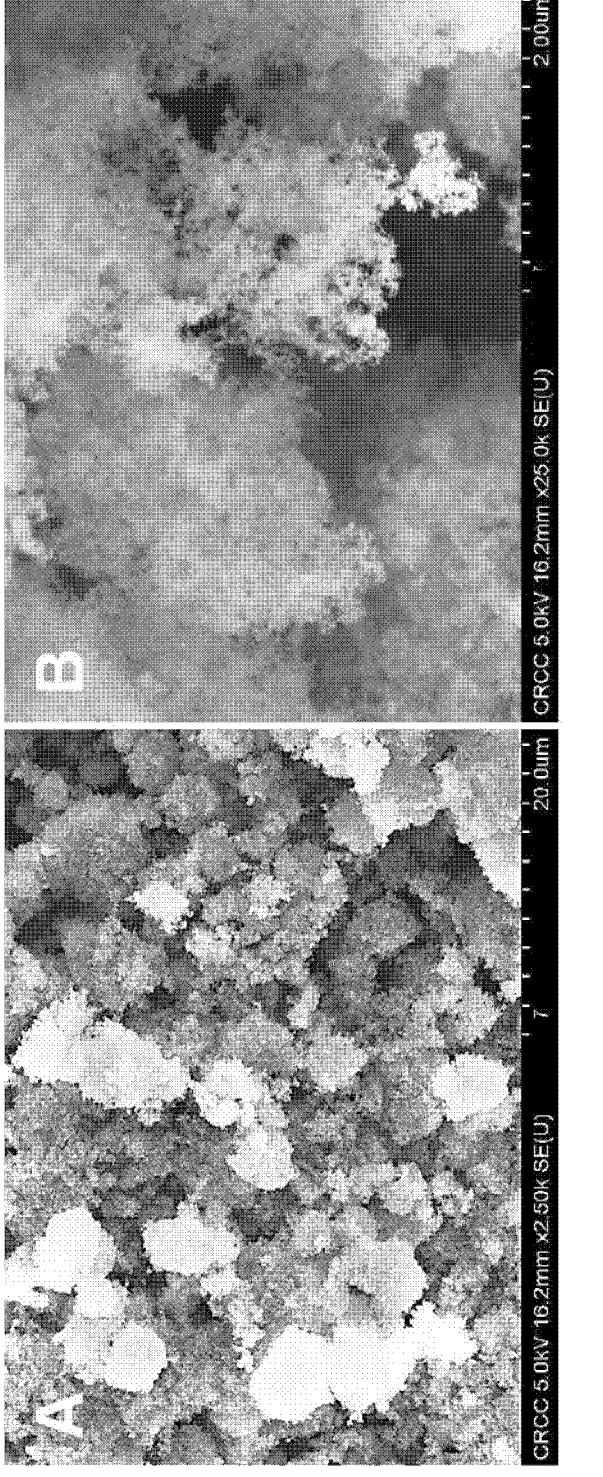
FIGS. 10A-D are SEM photographs of samples prepared according to the Examples herein.
Figures 10C, 10D:
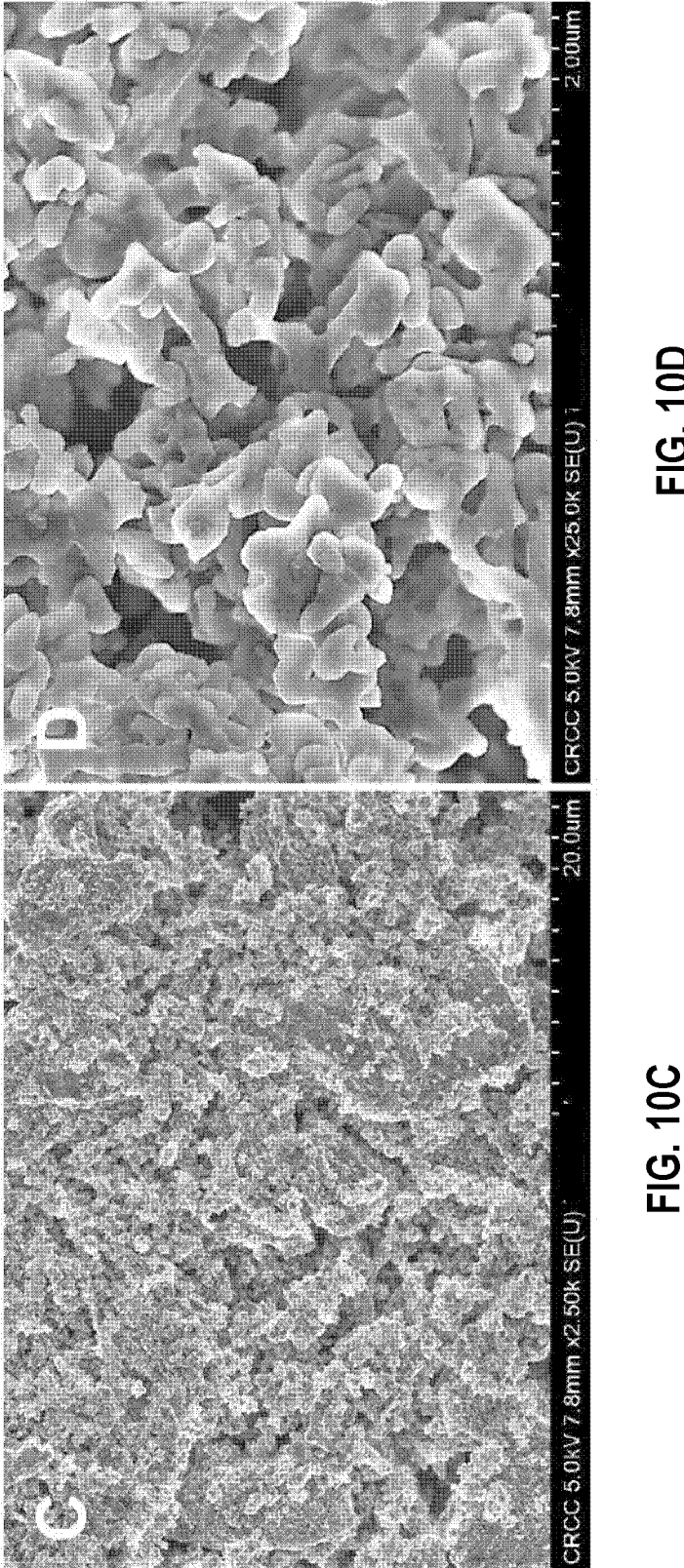

The inorganic particles were deposited on or in the porous walls of a wall flow filter body having the following characteristics: diameter of 4.055 inches (10.3 cm), length of 5.47 inches (13.9 cm), cells per square inch (CPSI) of 200, wall thickness of 8 mils (203 micrometers), and average pore size of 14 μm. Different average primary particle sizes of the inorganic particles were tested. Fine $Al_2O_3$ particles were tested having a surface area of 130 $m^2$/g, and an equivalent diameter of the primary particle was around 10 nm. Bigger particles were also tested having nominally 150-200 nm D50. As examples, two types of $Al_2O_3$ particles were evaluated. FIG. 10 illustrates the morphology of primary particles as well as their agglomerates. Fine particles having a BET surface area of 130 $m^2$/g and large particles having a BET surface area around 6.7 $m^2$/g were tested to be 150-200 nm by SEM. FIG. 10A is an SEM photograph of agglomerates formed by fine particles; generally, the rough spheres packed randomly to form the deposit on the walls. FIG. 10B is a 10× close-up of FIG. 10A, which shows a porous and interconnected structure of ~10 nm particles. FIG. 10C is an SEM photograph of agglomerates with poor sphericity wherein the agglomerates were generated from large particles and also appeared to accumulate randomly to form the deposits. FIG. 10D is a 10× close-up of FIG. 10C, which showed the primary particles in irregular shape with smooth surfaces. The agglomerate size distributions of fine particles from SEM image analysis are listed in Table 1. The median diameter, Q1, Q3 and sample numbers are listed. The agglomerate size is in the range of 2 to 6 micrometers. There was a statistical difference in the channel length direction: the agglomerate size at or near the outlet end of channels (90% depth axially into the channel) was larger than that at or near the inlet face (10% depth axially into the channel). Without being bound to any theory, such difference may be due to larger agglomerates being heavier, and therefore more readily fall under gravity into 90% depth of channels. The median pore size (d50) of the alumina deposits was much smaller than the pore size of the honeycomb filter substrate walls as well as the agglomerates (about 14 micrometers).

TABLE 1

| Agglomerate size and membrane thickness distribution | | | | | |
|---|---|---|---|---|---|
| | Agglomerate Size (micrometers) | | | Membrane Thickness (micrometers) | | |
| | 10% depth | 50% depth | 90% depth | 10% depth | 50% depth | 90% depth |
| Q1 | 2.35 | 3.29 | 2.745 | 52.1 | 120.5 | 132.5 |
| Median | 3.09 | 3.91 | 4.02 | 62.25 | 129 | 152 |
| Q3 | 3.805 | 5.34 | 6.035 | 67.125 | 121.6 | 166 |
| Sample Number | 133 | 129 | 74 | 24 | 28 | 25 |

Figure 11B:
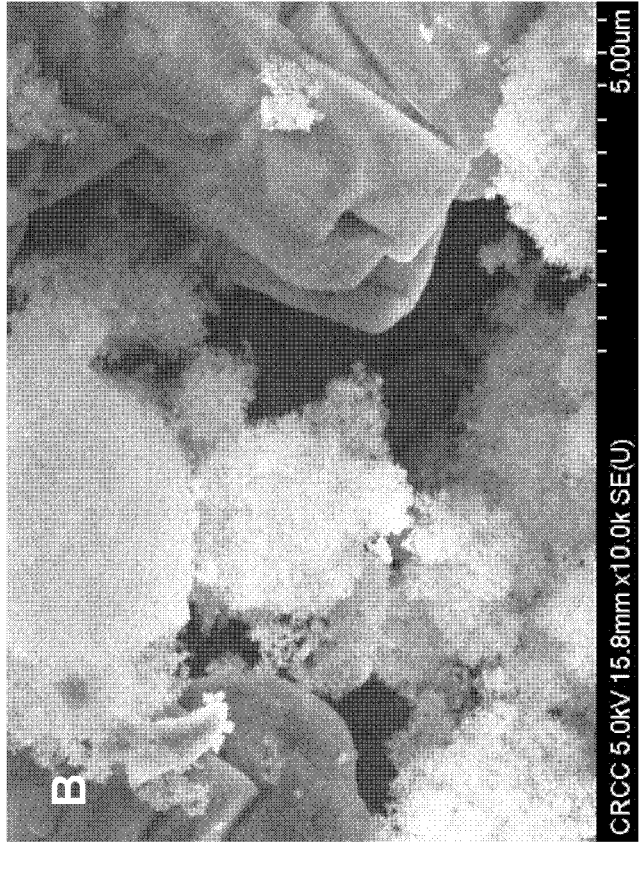
FIG. 11A-D are SEM photographs of samples prepared according to the Examples herein.
Figure 11A:
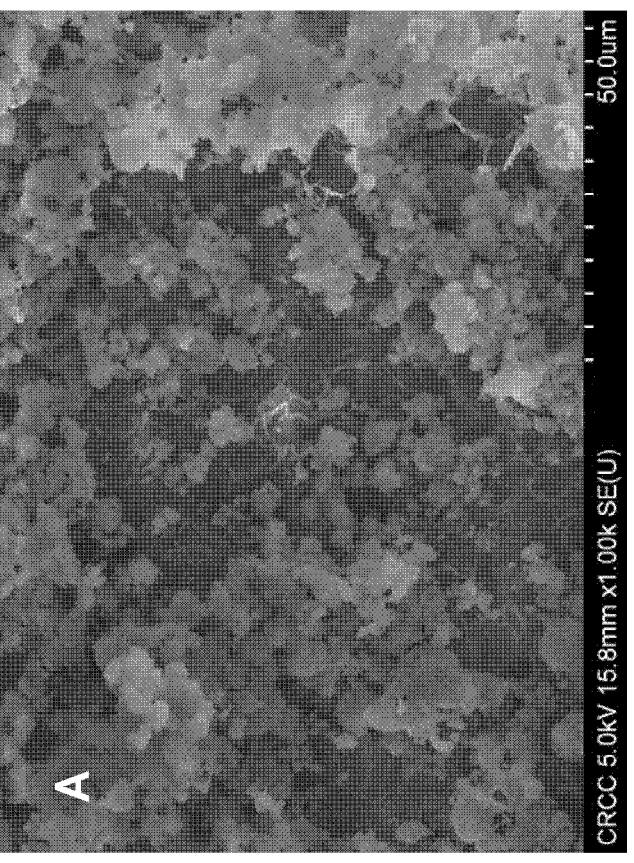
Figures 11C, 11D:
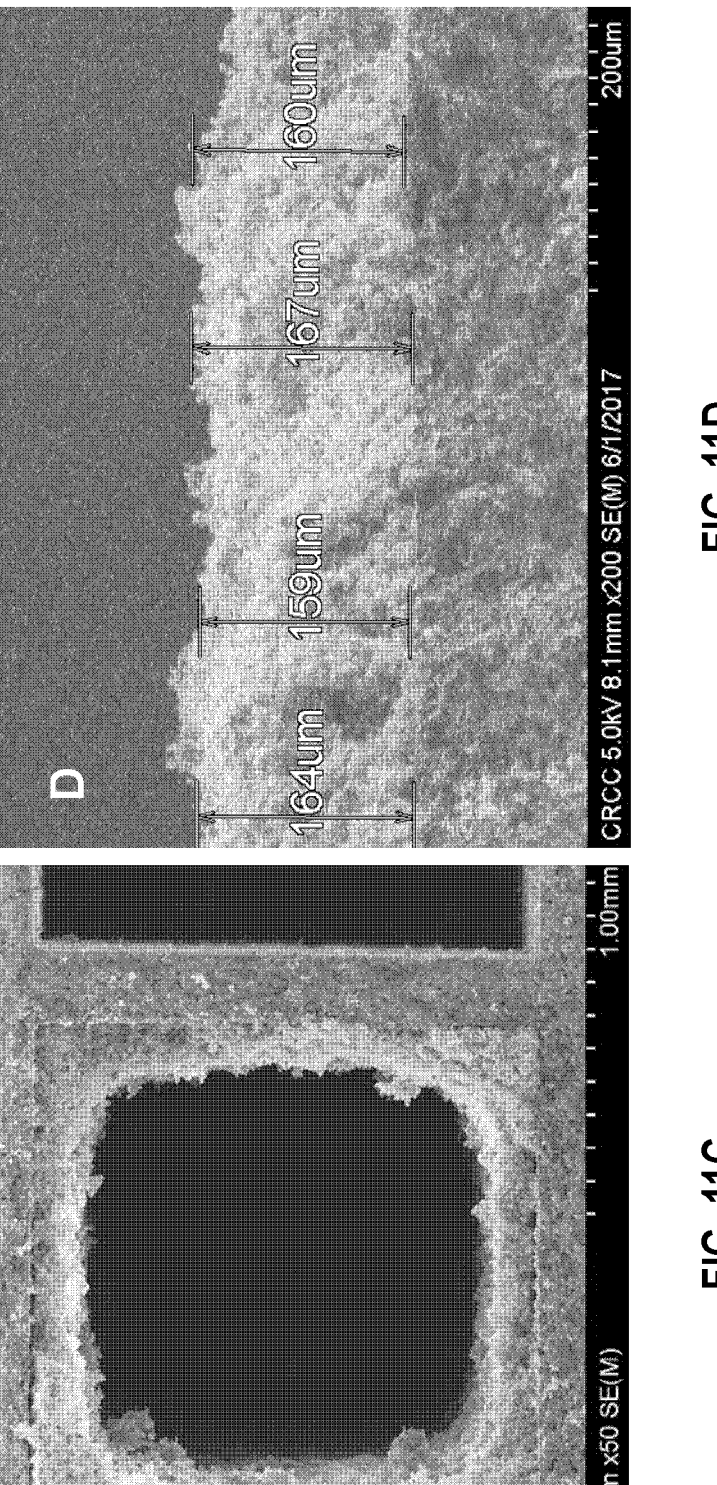

FIG. 11A is an SEM photograph of inorganic deposits located on porous walls of a wall flow filter, where no open pores were observed. FIG. 11B is a 10× close-up of FIG. 11A which showed at least portions of open pores were blocked by agglomerates. FIG. 11C is an SEM photograph of a cross-section view of the wall flow filter having inorganic deposits of FIG. 11A, and FIG. 11D is a 10× close-up of a portion of FIG. 11C annotated with a scale to show thicknesses of the inorganic deposits. From the cross-sectional images, the thickness of the layer of inorganic deposits was up to 160 micrometers on the side wall while thicker around the corner. According to a density calculation based on SEM measurement, the porosity of the layer was estimated to be 99.4%. Obtaining porosity by density calculation could be obtained by: measuring weight of the deposit layer and its thickness to obtain a layer density and calculating the porosity of the layer according to the equation: porosity=1−layer density/inorganic material density. Such high porosity structure would be applied to provide an improved higher filtration efficiency with a small additional dP penalty at a zero-soot loading. The deposit thickness distribution of fine particles from SEM image analysis are also listed in Table 1. The median diameter, Q1, Q3 and sample numbers are listed. The deposit layer thickness is in the range of 50 to 170 micrometers, with a gradient in the axial channel direction. The deposits at or near the outlet end of channels (90% depth) was much thicker than that at or near the inlet face (10% depth).

Filtration Performance

Figure 13:
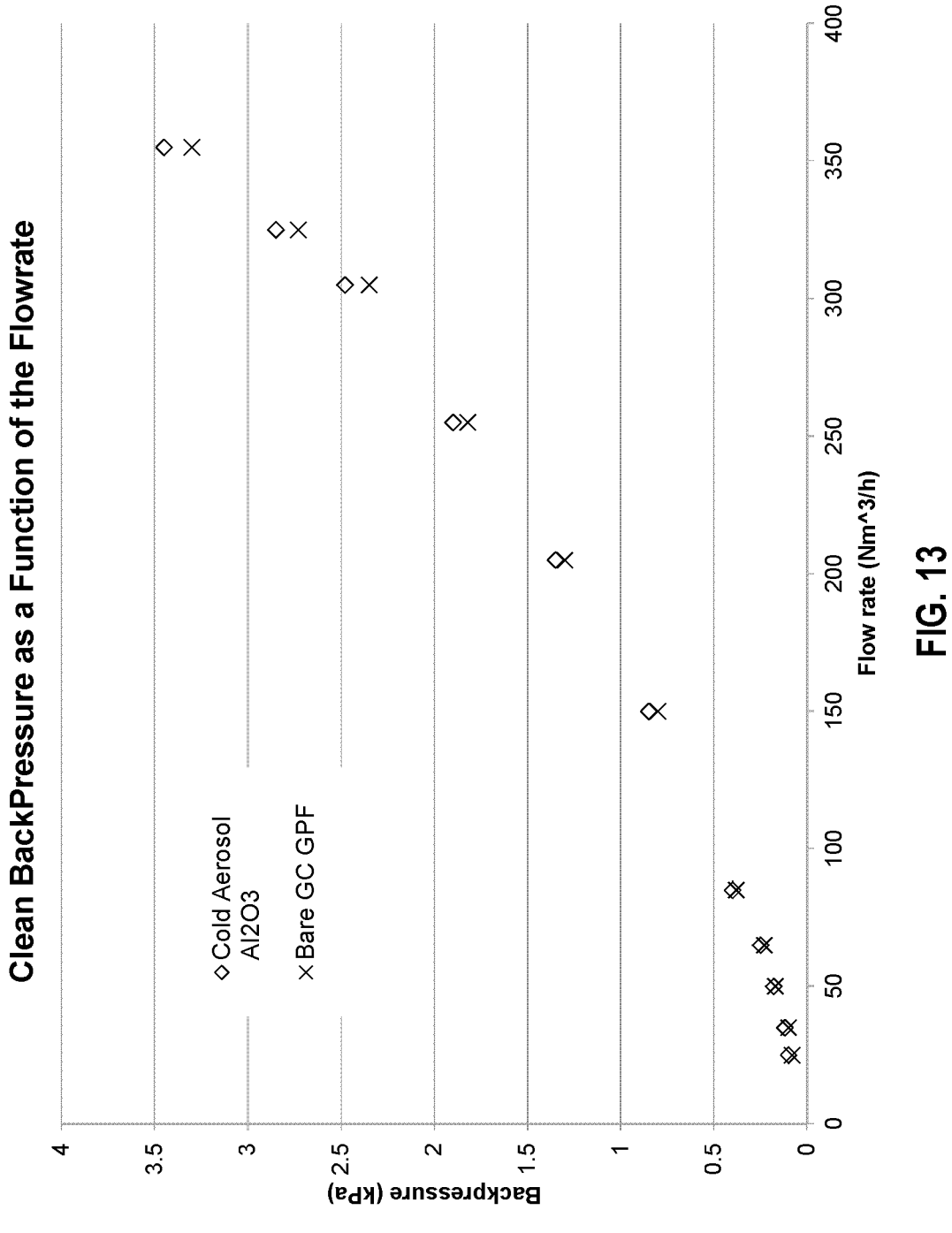
FIG. 13 is a graph showing clean back pressure as a function of flow rate for samples prepared according to the Examples.

To evaluate the filtration efficiency of the particulate filter comprising inorganic deposits, an alumina membrane was deposited in wall flow filter having the following characteristics: diameter of 4.055 inches (10.3 cm), length of 5.47 inches (13.9 cm), cells per square inch (CPSI) of 200, wall thickness of 8 mils (203 micrometers), and average pore size of 14 μm. The fine alumina particles were tested having a surface area of 130 m$^2$/g, and an equivalent diameter of the primary particle was around 10 nm as described above. Various simulated engine filtration efficiency tests could be used to evaluate the filtration efficiency (FE), such as a smoke FE test or a Lab soot FE test; the filtration efficiency of a filter could be tested with the filter in various states of soot loading, or even no soot load for which the smoke FE test is well suited, such that the same filter can be subjected to a backpressure test, for example to assess pressure drop (dP) penalty of added inorganic deposits. Thus, one simulated engine filtration efficiency test is a Lab soot FE/dP test which measures FE as a function of soot load wherein soot is loaded onto the filter m a lab environment (i.e. off-vehicle), and the pressure drop is measured across the filterpart at different flow rates and at different soot loadings; another FE test is a Smoke FE test using smoke particles or nanoparticles and the pressure drop across a filter can be measured at different flow rates, even without loading soot into or onto the filter part, wherein a curve such in FIG. 13 is generated. The term "clean" refers to a zero soot loading or no soot loading. Unless otherwise noted, a soot loaded backpressure is measured at one flow rate (generally 357 Nm$^3$/hr). Procedures are described below for the "Smoke filtration efficiency test".

Figure 12:
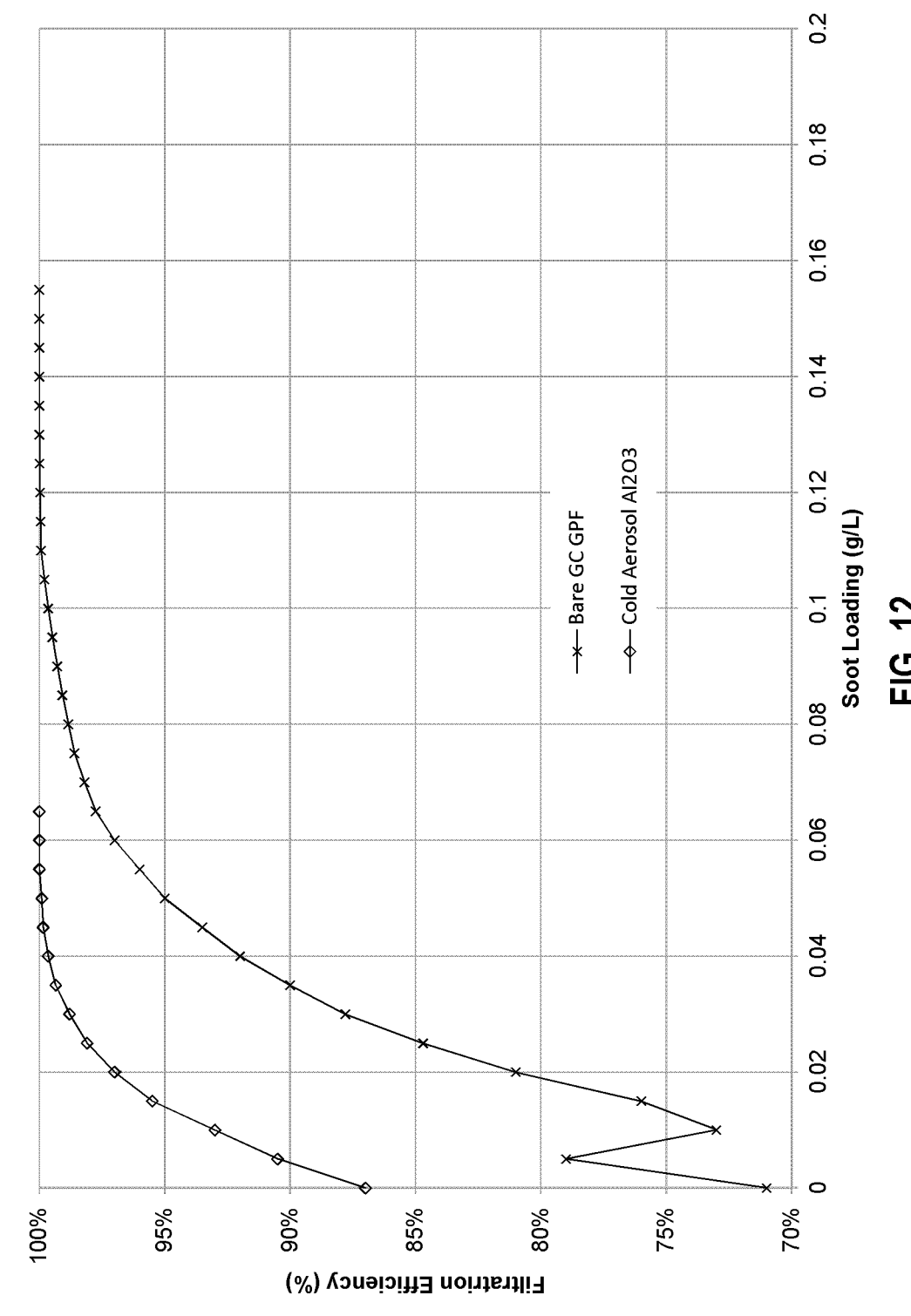
FIG. 12 is a graph showing filtration efficiency as a function of soot loading for plugged honeycomb filter body samples prepared according to the Examples.
Figure 14:
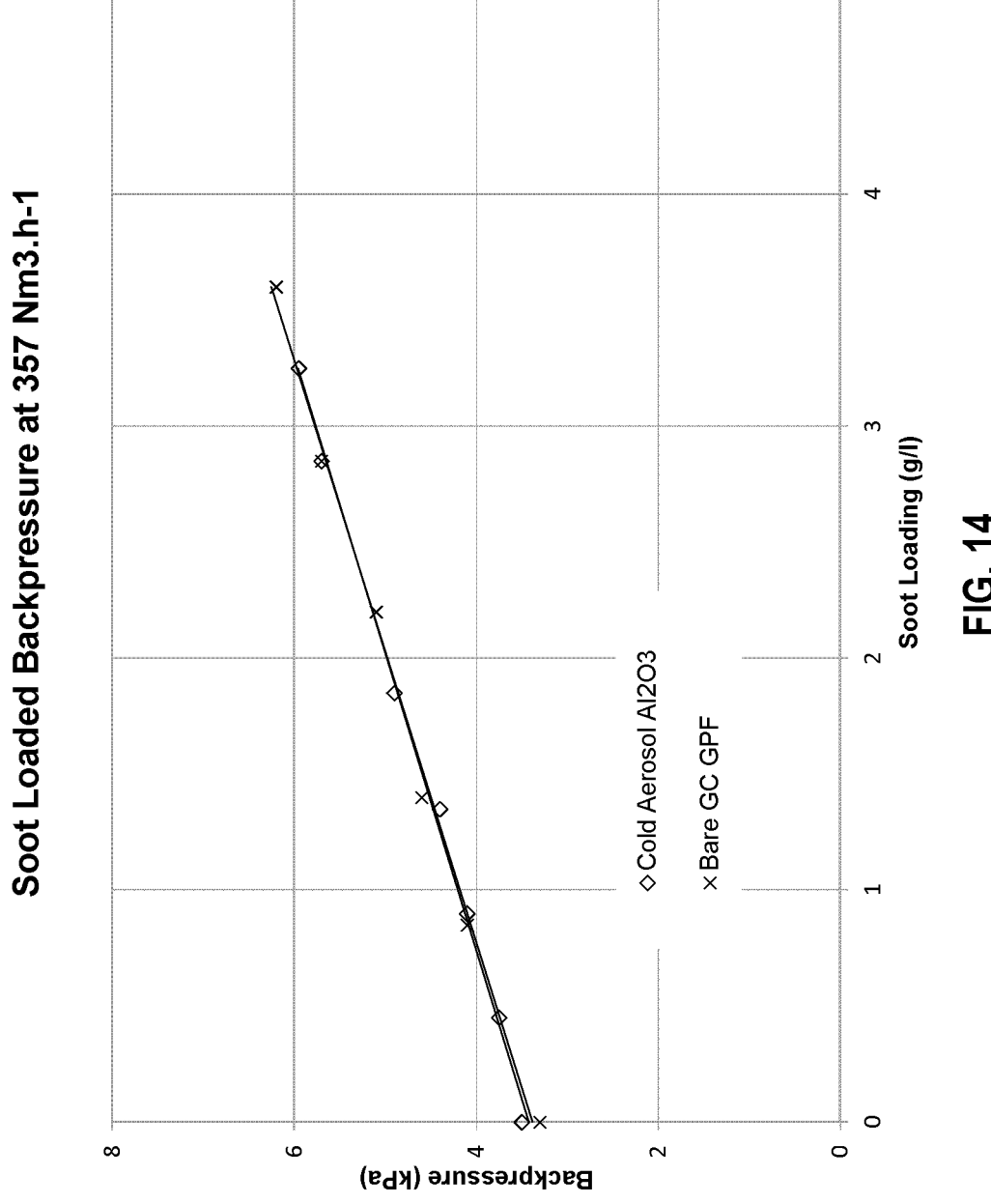
FIG. 14 is a graph showing soot loaded backpressure for samples prepared according to the Examples.

FIG. 12 compares the filtration efficiency between a bare sample and a sample including a dry aerosol membrane. It was observed that initial FE increased after deposition of the dry aerosol membrane, and the soot-loaded FE @0.01 g/L could reach up to 94.5%. In addition, compared to the bare sample, much less soot accumulation was present on the sample with the dry aerosol membrane when FE reached 100%. As shown in FIG. 13, when the initial FE of membrane sample was up to 87.4%, the DP penalty was only 4.6%. As shown in FIG. 14, backpressure rose with the soot loading amount increasing. The dry aerosol membrane sample exhibited a lower pressure drop penalty than the bare sample when the soot loading was higher than 0.5 g/L.

Durability Testing

To evaluate durability of the particulate filter comprising inorganic deposits, the above-referenced filter article tested for filtration performance was further subjected to the following.

Thermal treatment. During a "thermal treatment test" the filter was treated at 1150° C. for 0.5 hour.

Vibration. A "vibration test" (76 g, 200 Hz, 2 h) was performed, by fixing the canned filter in a metal box and then installing it on a vibration bed. The vibration acceleration was up to 76 g acceleration, and the vibration frequency was 200 Hz. The canned filter was vibrated in the horizontal direction for 1 hour and then in the vertical direction for another 1 hour.

Lab soot filtration efficiency test (simulated engine filtration efficiency test). After pre-test canning for 6 hours, an air stream is supplied by a blower upstream of the article at a ramped rate, and clean pressure drop is measured across the filter using a differential pressure sensor/gauge at room temperature (about 25° C.). The flow rate of the air stream was ramped from 25.5 m$^3$/h to 356.8 m$^3$/h over 10 step increases, where the flow rate was maintained for one minute at each new step increase. Each step increase was in a range of about 8 to 68 m$^3$/h. Next, an air stream containing soot particles at a concentration of 8 mg/m$^3$ and a flow rate of 22.5 m$^3$/h is introduced upstream of the filter for 45 minutes. The soot is generated at 110-120 nm particle size from a commercially-available propane burner. Clean filtration efficiency at 30° C. is determined by measuring the difference between a number of particulates that are introduced into the article and a number of particulates that exit the article before and after exposure to the flow conditions. After the clean filtration efficiency is measured, post-test cleanout is conducted to remove 100% of the soot, 9 or 12 h.

A "smoke test" or "smoke FE test", was conducted as follows. 300 nm median cigarette smoke particulate was used to measure the filtration efficiency. The upstream concentrations were 500,000 particles over 30 seconds which is equal to approximately 353 particles/cc with a 0.1 cfm flow rate into a Lighthouse Handheld 3016 particle counter. The particle number was collected for 30 seconds upstream and downstream simultaneously with two particle counters. The air velocity was 51 m$^3$/h. The filtration efficiency was calculated based on reduction of particulate number concentration at downstream. The pressure drop was measured at the same flow rate by differential pressure gauge. Such smoke FE test could be used to evaluate FE before and after durability testing such as represented FIGS. 15-16, and thus provide a measure of the durability of the filtration deposits. Such smoke FE test could thus be used before and after durability testing of a filter part.

High Flow. As used herein, "High Flow Test" refers to testing an article as follows. An article is first measured for baseline FE/dP measurement by the smoke FE test (see FIGS. 15-16). Thereafter, high flow is introduced to the article. The flow rate of the exhaust gas upstream from the assembly is ramped from 85 m$^3$/h to 850.8 m$^3$/h over 10 step increases at about 25° C., where the flow rate was maintained for one minute at each new step increase. Each step increase was in a range of about 85-170 m$^3$/h. Next, an air stream containing soot particles at a concentration of 8 mg/m$^3$ and a flow rate of 22.5 m$^3$/h is introduced upstream of the filter for 45 minutes. The soot is generated at ~110 nm particle size from a commercially-available propane burner. Clean filtration efficiency at 30° C. is determined by measuring the difference between a number of particulates that are introduced into the article and a number of particulates that exit the article before and after exposure to the flow conditions. After the filtration efficiency is measured, post-test cleanout is conducted for 6 hours. Filtration efficiency at 0 g/L soot is compared before and after the article is exposed to the high flow test.

Figure 15:
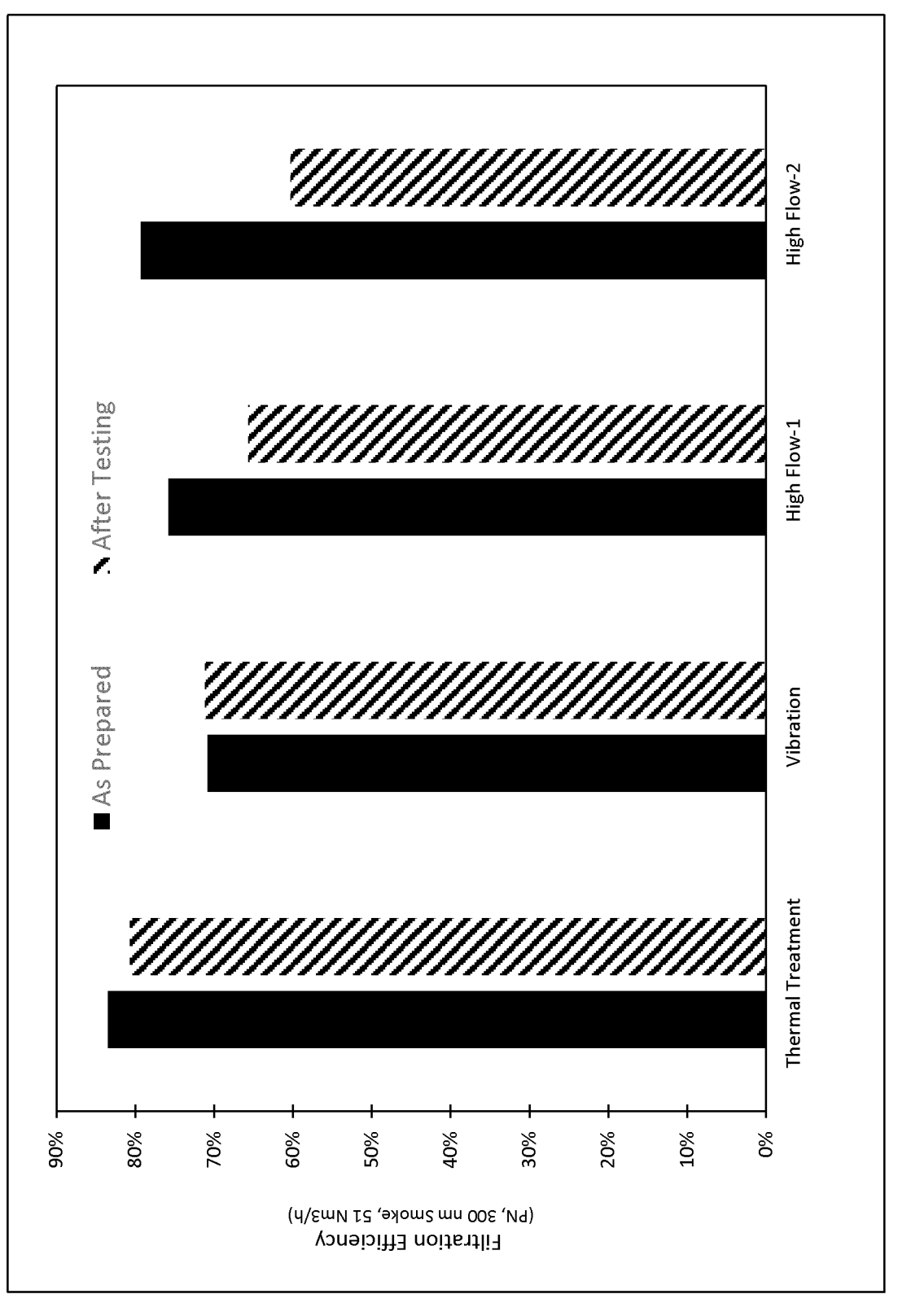
FIG. 15 is a plot of filtration efficiency for a sample as-prepared and after durability testing.
Figure 16:
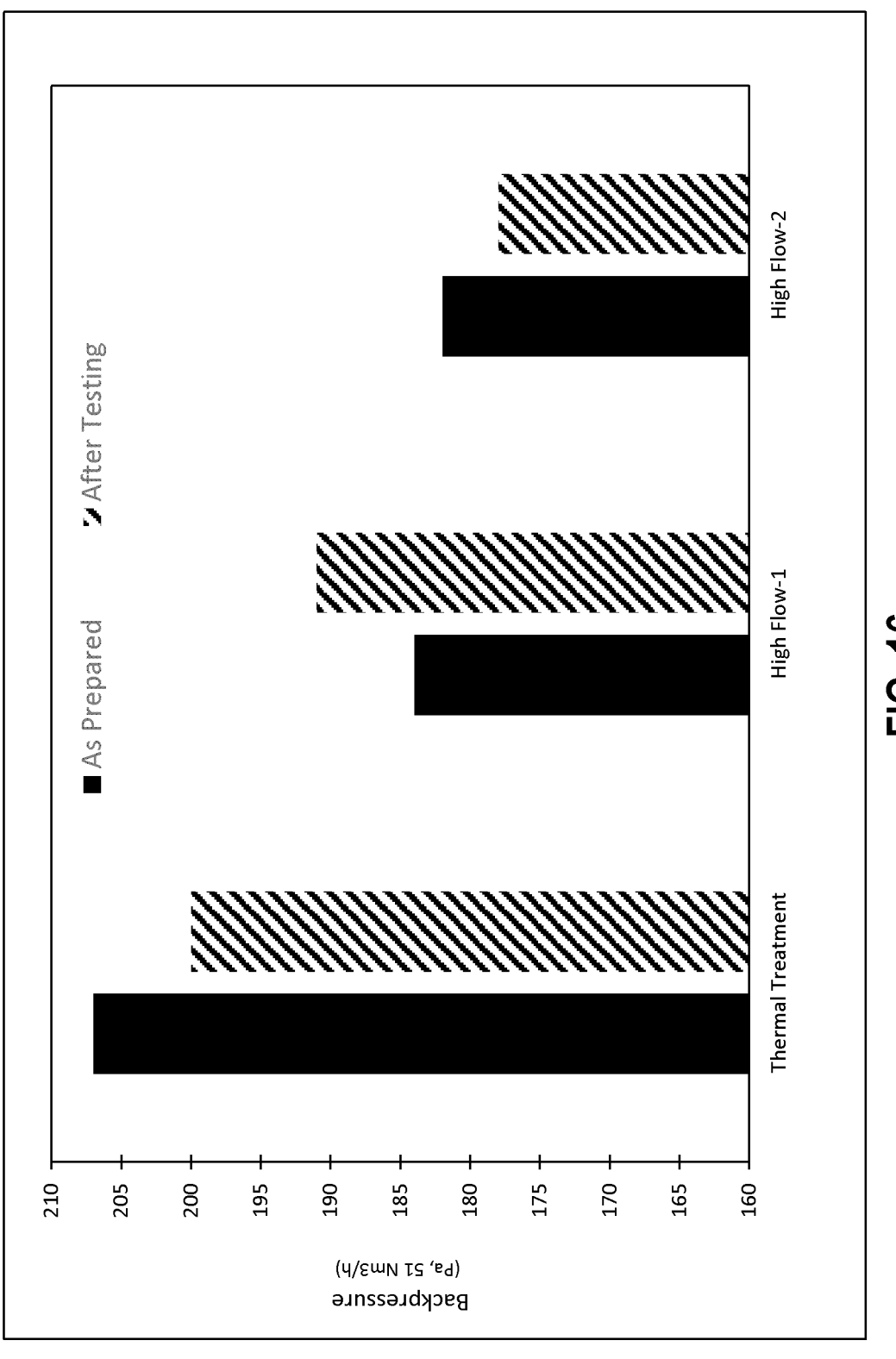
FIG. 16 is a plot of backpressure for a sample as-prepared and after durability testing.

FIGS. 15-16 show a comparison of smoke filtration efficiency and backpressure, respectively, for a sample as-prepared and after durability testing of thermal treatment, vibration, and high flow. Reference to "High Flow-1" and "High Flow-2" means testing on two different samples: High Flow-1 sample had fine alumina deposits and High Flow-2 had coarse alumina deposits. The filtration efficiency of FIG. 15 was measured according to the smoke FE test described above. The backpressure of FIG. 16 was the clean pressure drop discussed above.

As shown in FIG. 15, after thermal treatment, there was a decrease of 2.8% in filtration efficiency value (from 83.5% to 80.7%). That is, the post-thermal treatment smoke filtration efficiency was 96.7% of the initial smoke filtration efficiency (80.7% divided by 83.5%). After vibration, the smoke filtration efficiency value was within 0.5% relative to the as-prepared sample (71.2% versus 70.9%). That is, the post-vibration smoke filtration efficiency was 99.5% of the initial smoke filtration efficiency (70.9% divided by 71.2%). After the high flow test, there was a decrease of 10.1% in filtration efficiency value (from 75.8% to 65.7%) for the fine alumina deposited article; and after the high flow test, there was a decrease of 19.0% in filtration efficiency value (from 79.3% to 60.3%) for the coarse alumina deposited article. That is, the post-high flow treatment smoke filtration efficiency was 86.7% of the initial smoke filtration efficiency (65.7% divided by 75.8%) for the fine alumina deposited article, and the post-high flow treatment smoke filtration efficiency was 76% of the initial smoke filtration efficiency (60.3% divided by 79.3%) for the coarse alumina deposited article.

As shown in FIG. 16, after thermal treatment, there was a decrease of 7 Pa in backpressure (from 207 to 200 Pa); after the high flow test, there was an increase of 7 Pa in backpressure (from 184 to 191 Pa) for the fine alumina deposited article; and after the second high flow test, there was a decrease of 4 Pa in backpressure (from 182 to 178 Pa) for the coarse alumina deposited article.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments." "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. An apparatus configured to apply inorganic particles to a plugged honeycomb body comprising porous walls, an inlet end and an outlet end, the apparatus comprising:
   a duct spanning from a first end to a second end;
   a deposition zone configured to house the plugged honeycomb body and in fluid communication with the second end of the duct;
   an inlet conduit in fluid communication with the duct, the inlet conduit upstream from the deposition zone;
   an inorganic particle source in fluid communication with the inlet conduit and configured to supply inorganic particles to the inlet conduit;
   a delivery conduit configured to receive the inorganic particles from the inorganic particle source;
   a drying apparatus positioned upstream from the delivery conduit and configured to dry the inorganic particles;
   an aerosol generator comprising a Venturi tube comprising a first end and a second end in fluid communication with the inlet conduit, the aerosol generator configured to deliver an aerosol comprising the inorganic particles and air to the deposition zone; and
   a flow generator in fluid communication with the duct and the deposition zone, the flow generator configured to establish a flow of a gas and the inorganic particles introduced into the duct.

2. The apparatus of claim 1, wherein the delivery conduit comprises a flared first end configured to receive the inorganic particles from the inorganic particle source.

3. The apparatus of claim 2, wherein the delivery conduit further comprises a second end connected to the first end of the Venturi tube, the apparatus further comprising a pressurized gas source in communication with the inlet conduit.

4. The apparatus of claim 3, wherein the Venturi tube comprises a reduced cross-sectional area portion between the first end and the second end of the Venturi tube.

5. The apparatus of claim 1, wherein the apparatus further comprises an inorganic particle feed system configured to deliver inorganic particles from the inorganic particle source to the inlet conduit.

6. The apparatus of claim 5, wherein the inorganic particle feed system comprises a conveyor.

7. The apparatus of claim 1, wherein the drying apparatus comprises a drying lamp.

8. The apparatus of claim 1, further comprising a roller positioned upstream from the delivery conduit, the roller configured to reduce agglomerates that enter the delivery conduit.

9. The apparatus of claim 1, wherein the flow generator comprises a fan.

10. The apparatus of claim 9, wherein the fan is positioned at the inlet end of the duct and upstream from the inlet conduit.

11. The apparatus of claim 10, further comprising a homogenizer plate configured to homogenize flow through the duct.

12. The apparatus of claim 1, further comprising a first pressure sensor located upstream from the deposition zone and a second pressure sensor downstream from the deposition zone, the first pressure sensor and the second pressure sensor in communication with a processor which measures a differential pressure between the first pressure sensor and the second pressure sensor.

* * * * *